US012226779B2

(12) United States Patent
Bonnoitt, Jr. et al.

(10) Patent No.: US 12,226,779 B2
(45) Date of Patent: Feb. 18, 2025

(54) PIPETTE TIP RACK SYSTEM

(71) Applicant: Integra Biosciences AG, Zizers (CH)

(72) Inventors: George K. Bonnoitt, Jr., Amherst, NH (US); Christopher LaCroix, Bedford, NH (US)

(73) Assignee: Integra Biosciences AG, Zizers (CH)

( * ) Notice: Subject to any disclaimer, the term of this patent is extended or adjusted under 35 U.S.C. 154(b) by 0 days.

(21) Appl. No.: 18/454,999

(22) Filed: Aug. 24, 2023

(65) Prior Publication Data

US 2023/0398548 A1 Dec. 14, 2023

Related U.S. Application Data

(62) Division of application No. 17/143,486, filed on Jan. 7, 2021, now Pat. No. 11,850,596.

(Continued)

(51) Int. Cl.

| | |
|---|---|
| ***B01L 9/00*** | (2006.01) |
| ***B01L 3/02*** | (2006.01) |
| ***B65D 43/16*** | (2006.01) |

(52) U.S. Cl.

CPC ............. *B01L 9/543* (2013.01); *B01L 3/0275* (2013.01); *B65D 43/162* (2013.01);

(Continued)

(58) Field of Classification Search

CPC .. B01L 9/543; B01L 3/0275; B01L 2200/022; B01L 2300/043;

(Continued)

(56) References Cited

U.S. PATENT DOCUMENTS

| | | | |
|---|---|---|---|
| 3,643,812 | A | 2/1972 | Mander et al. |
| 5,392,914 | A | 2/1995 | Lemieux et al. |

(Continued)

FOREIGN PATENT DOCUMENTS

| | | |
|---|---|---|
| DE | 10 2009 020 811 | 11/2010 |
| EP | 1 110 613 | 6/2001 |

(Continued)

OTHER PUBLICATIONS

European Patent Application No. 21738970.9, Supplementary European Search Report dated Jan. 5, 2024, 13 pages.

(Continued)

*Primary Examiner* — Jill A Warden
*Assistant Examiner* — Alex Ramirez
(74) *Attorney, Agent, or Firm* — Andrus Intellectual Property Law, LLP

(57) ABSTRACT

A pipette tip rack system includes a thermoformed clamshell tip container and a dispenser for the clamshell tip container. The tip dispenser includes a base for holding the clamshell container, cover and a lifting mechanism for lifting the lid of the tip container and the cover when a latch on the base is released. The tip dispenser is configured to facilitate one-touch operation so that a laboratory work may hold a pipette in the other hand while using the dispenser, and conveniently open and close the dispenser cover to reduce the risk of contamination. The dispenser can be used without the thermoformed tip container as well.

6 Claims, 22 Drawing Sheets

Related U.S. Application Data

(60) Provisional application No. 62/957,964, filed on Jan. 7, 2020.

(52) U.S. Cl.
CPC ... *B01L 2200/022* (2013.01); *B01L 2300/043* (2013.01); *B01L 2300/0858* (2013.01); *B01L 2300/12* (2013.01); *B01L 2400/0403* (2013.01); *B65D 2543/00194* (2013.01); *B65D 2543/00296* (2013.01)

(58) Field of Classification Search
CPC ......... B01L 2300/0858; B01L 2300/12; B01L 2400/0403; B65D 43/162; B65D 2543/00194; B65D 2543/00296
See application file for complete search history.

(56) References Cited

U.S. PATENT DOCUMENTS

| | | | | |
|---|---|---|---|---|
| 5,622,676 | A | 4/1997 | Lind | |
| 5,642,816 | A | 7/1997 | Kelly et al. | |
| 6,019,225 | A | 2/2000 | Kalmakis et al. | |
| 6,098,819 | A | 8/2000 | Link | |
| 6,221,317 | B1 | 4/2001 | Carl | |
| 6,286,678 | B1 | 9/2001 | Petrek | |
| 6,328,933 | B1 | 12/2001 | Labriola et al. | |
| 8,900,533 | B2 | 12/2014 | Cohen | |
| 9,352,324 | B2 | 5/2016 | Rethwisch et al. | |
| 9,617,036 | B2 | 4/2017 | Baker | |
| 9,662,654 | B2 | 5/2017 | Iten et al. | |
| 2002/0108917 | A1 | 8/2002 | Maruyama | |
| 2005/0082243 | A1 | 4/2005 | Lahti et al. | |
| 2006/0000833 | A1 | 1/2006 | Boots et al. | |
| 2006/0266719 | A1 | 11/2006 | Knight et al. | |
| 2010/0166616 | A1 | 7/2010 | Price | |
| 2010/0258578 | A1 | 10/2010 | Motadel | |
| 2014/0271412 | A1 | 9/2014 | Hovatter | |
| 2015/0225139 | A1 | 8/2015 | Baker | |
| 2015/0367349 | A1 | 12/2015 | Leinonen et al. | |
| 2016/0001292 | A1 | 1/2016 | Motadel et al. | |
| 2016/0023816 | A1 | 1/2016 | Giraud et al. | |
| 2016/0288126 | A1 | 10/2016 | Motadel et al. | |
| 2017/0008001 | A1* | 1/2017 | Motadel | B01L 9/543 |
| 2017/0029173 | A1* | 2/2017 | Baker | B65D 25/108 |
| 2017/0217637 | A1 | 8/2017 | Auerbach | |
| 2019/0275528 | A1* | 9/2019 | Rethwisch | B65D 25/108 |

FOREIGN PATENT DOCUMENTS

| | | |
|---|---|---|
| EP | 2535109 | 12/2012 |
| EP | 2 848 308 | 3/2015 |
| EP | 3320975 | 5/2018 |
| JP | 62-227452 | 9/1988 |
| JP | 2002529331 | 9/2002 |
| JP | 0003178839 | 10/2012 |
| JP | 60-98670 | 5/2015 |
| JP | 2019536619 | 12/2019 |
| WO | 0029113 | 5/2000 |
| WO | 2011116230 | 9/2011 |
| WO | 2015069664 | 5/2015 |

OTHER PUBLICATIONS

Japanese Patent Application No. 2022-541845, Office Action dated Sep. 5, 2023, 5 pages, and English Translation, 5 pages.
Mettler Toledo BioClean Pipette Racks; https://www.mt.com/us/en/home/products/pipettes/bioclean-pipette-tip/packaging.html; viewed Jan. 6, 2021.
Eppendorf General Lab Products Brochure 2018.
Rainin Eco-friendly tip racks brochure Mar. 2015.
International Search Report dated Mar. 10, 2021, in co-pending PCT application PCT/US2021/012448.

* cited by examiner

PIPETTE TIP RACK SYSTEM

CROSS-REFERENCE TO RELATED APPLICATION

This application is a division of U.S. patent application Ser. No. 17/143,486, filed Jan. 7, 2021, which claims benefit from U.S. Provisional Application No. 62/957,964, filed Jan. 7, 2020, the content of which is incorporated herein by reference in its entirety.

FIELD OF THE INVENTION

The invention relates to pipette tip racks, and more particularly to environmentally friendly, disposable tip containers that are used with a dispenser to store the container and the tips on the laboratory benchtop. Both the dispenser and the tip container are configured in particular to enable convenient one-touch operation. The user can use the dispenser once it is loaded with pipette tips even if items occupy both hands yet do so without the threat of contamination.

BACKGROUND OF THE INVENTION

Pipette tip racks are used to organize disposable pipette tips in a manner that is convenient to mount the tips onto a pipette. The racks typically include a tip deck or plastic insert with an array of holes, such as an 8×12 array, through which the pipette tips hang with the tip collars exposed upward. Conventional racks comprise a substantially rigid box suspending the tip deck at a height sufficient for the pipette tips to pass through the holes and be suspended by their collar. The rigidity of the box, and in particular the bottom receptacle, is important to promote reliable attachment of the pipette tips to the mounting shafts or fittings of the pipettes. Rigidity is especially important when attaching multiple pipette tips to the fittings on a multi-channel pipette. Tip rack boxes also have a cover which is usually transparent. Two hands are often used to remove the cover, although some are designed to facilitate opening and closing with a single hand. Common practice is to replace the cover after mounting some of the pipette tips in order to cover the remaining tips in the rack and reduce the risk of contamination.

The use of rigid tip racks can lead to substantial plastic waste in the laboratory. In order to reduce waste, recyclable, thermoformed clamshell tip containers have been developed and are used by some laboratories. These thermoformed clamshell tip containers include a lower tip receptacle and a lid connected by a rear hinge, and a tip deck or insert spanning over the well within the lower tip receptacle. The tip deck is similar to that used with conventional tip racks and is typically made of injection molded plastic. An array of pipette tips is held within holes through the tip deck. A locking tab on the front of the clamshell container enables the hinged lid to be locked in the closed position with an interference fit and prevents the tips from spilling out for example even when the container is dropped. One commercially available product uses clamshell containers made from recyclable PETE (polyethylene terephthalate).

Spent tip racks can take up a lot of space in the laboratory and can represent a significant amount of plastic waste. Known clamshell tip containers, on the other hand, are able to be nested into each other and lightweight so spent containers are easier to store and dispose of. Thermoformed clamshell tip containers are also much less expensive to manufacture and ship than conventional tip racks. Even though thermoformed clamshell tip containers are designed with ridges to add structural support, they can sometimes be awkward to use in the laboratory because they are not typically as stable as a conventional tip rack. Often laboratory workers will need to use their off hand to hold a thermoformed clamshell tip container when mounting pipette tips. For a weightier feel, more like a conventional tip rack, and improved stability, it is known to use a reusable base for the thermoformed clamshell tip container. One commercially available base includes a well for holding the thermoformed tip container defined by a floor, and lateral, rear and front sidewalls. The tip container sits on the floor and the front wall of the holder is cut away to enable the user to access the hinged locking tab on the front of the clamshell container. The lab worker will typically close the lid and the locking tab between uses, however, this can become somewhat inconvenient especially when the lab worker is trying to hold a pipette in one hand while repeatedly opening and closing the clamshell locking tab single handedly with the other hand.

Another issue is that this commercially available base for thermoformed tip containers cannot be used to store and dispense pipette tips held in only a tip deck, i.e., without the thermoformed clamshell tip container. For example, refill tips that are sold loaded in tip decks but packaged in paperboard packaging, which are intended to be loaded into a previously used conventional tip rack. The above described commercially available base does not provide independent support through its sidewalls for a tip deck, inasmuch as the tip containers sit on the floor of the base with the rim of the clamshell tip container being positioned at a location above and not touching the upper rim of the base sidewalls.

SUMMARY OF THE INVENTION

The invention pertains primarily to a thermoformed clamshell tip container and a tip dispenser for holding and supporting the clamshell tip container on the laboratory benchtop. The tip dispenser includes a solid base for holding the thermoformed clamshell tip container, and a hinged cover. A lifting mechanism lifts the lid of the thermoformed tip container and the cover of the dispenser when a latch on the dispenser base is released, for example by pushing a button on the front of the base. Both the tip dispenser and the clamshell tip container are configured to facilitate one-touch operation to open and close the cover of the dispenser and the lid of the clamshell tip container. The latch on the dispenser is desirably capable of being released, e.g., with the back of the hand, knuckle or elbow, when the lab worker has both hands full. The one-touch operation makes the pipette tips conveniently accessible while also making it convenient to cover the remaining tips after one or more of the tips are mounted onto a hand-held pipette.

In one aspect, the invention is directed to a pipette tip rack system including the combination of the thermoformed clamshell tip container and the covered tip dispenser holder. The clamshell tip container is preferably made of recyclable, clear or tinted transparent thermoformed plastic such as PET. It includes a lower tip receptacle and a lid connected by a hinge as is typical of thermoformed clamshell packaging. The tip receptacle has a bottom wall, lateral sidewalls, a front sidewall and a back sidewall, which define a well for holding and storing pipette tips. The tip container also includes a tip deck spanning over the well. The tip deck, sometimes called a rack insert, is preferably made of injection molded plastic, and is supported on the rim along the upper edge of the sidewalls around the well in the thermoformed tip container. The tip deck is configured to hold an array of pipette tips substantially vertically with collars of the respective pipette tips facing upward to facilitate mounting of the pipette tips onto pipette fittings. As is known in the art, the tip deck includes an array of holes for holding the pipette tips with the centerline of the respective holes spaced apart from one another at a spacing of 4.5 mm for arrays of 384 tips or 9 mm for arrays of 96 tips. The tip deck is preferably made of a color representing the configuration of fittings onto which the pipette tips held in the tip deck will fit. The walls of the thermoformed tip container include strengthening ridges to enable mounting of tips to pipette fittings without using the tip dispenser, if desired by a laboratory worker. When not using the tip dispenser, however, it is likely the laboratory worker will need to hold the thermoformed container with one hand to stabilize the container while using the other hand to hold the pipette and mount the tip or tips.

As mentioned, the tip dispenser facilitates reliable one-touch operation by securing the thermoformed tip container and tip deck reliably within the base. The base may be weighted to provide additional stability. In addition, a dampening mechanism can be used to dampen the speed at which the dispenser cover opens. Before use, the clamshell tip container loaded with pipette tips is set in the base, and a locking tab on the lid of thermoformed clamshell container is released to allow the lid to open. In one embodiment, the front wall of the lid has one or more detents that engage with the backside of one or more detents on the locking tab to hold the locking tab against the front wall of the clamshell lid. Holding the locking tab against the lid stows it out of the way of the latch on the dispenser. Alternatively, the locking tab can be manually stowed between the front wall of the clamshell lid and the front wall of the dispenser cover by tucking the locking tab under the cover of the dispenser when loading the tip container. Then, the cover of the tip dispenser is closed and latched shut. It is preferred that the cover of the dispenser be made of a clear material, and as mentioned above that the clamshell tip container be made of a clear material, so that the user can see the pipette tips and the tip deck when the cover is closed. When the laboratory worker needs to access the pipette tips, the latch is released preferably by pushing a button on the front of the dispenser base and the lifting mechanism automatically lifts the dispenser cover and at the same time the lid of the clamshell tip container to expose pipette tips held in the tip deck. The laboratory worker then mounts one or more pipette tips onto the pipette and closes the dispenser cover and clamshell lid in order to reduce the risk of contamination. The lab worker is able to open and close the dispenser cover, as mentioned, conveniently even with both hands full.

In an exemplary embodiment of the invention, the lifting mechanism comprises at least one lifting arm pivotally connected to the base of the tip dispenser, along the upper rim of a sidewall on the base. It is preferred to have two lifting arms with one on the rim of each lateral sidewall. The lifting arms are each spring biased to rotate the respective lifting arm to lift the dispenser cover, i.e. rotate the hinged cover upward and rearward. As mentioned, the lifting arms also lift the lid of the clamshell tip container at the same time that the dispenser cover is lifted. Once the locking tab is on the clamshell tip container is opened, friction or interference between the lid or stowed locking tab of the clamshell tip container and the dispenser cover will normally be sufficient to hold the clamshell lid within the dispenser cover when the dispenser cover is lifted. However, to facilitate the contemporaneous lifting of the clamshell tip container lid, the clamshell tip container has an overhanging wing extending outward from the rim along a lower edge of the respective lateral side wall of the lid. If the dispenser includes two lifting arms, it is preferred that the clamshell tip container have an overhanging wing on each side of the container lid. Each overhanging wing extends outward farther than a corresponding portion of the rim along the upper edge of the bottom receptacle. This enables the respective lifting arm on the tip dispenser to push upward directly against the respective overhanging wing to lift it upward to open the lid of the clamshell tip container without lifting the bottom receptacle of the clamshell tip container. The respective lifting arms also preferably have a ledge that pushes up on the dispenser cover to lift the cover. In this way, the lid of the clamshell tip container is lifted at the same time as the cover of the dispenser.

The rims on the bottom receptacle and the lid do not have an interference fit so the lid is able to open freely when the locking tab is released. To ensure that the bottom receptacle does not lift and otherwise remains stable in the base of the dispenser, one or more of the walls of the thermoformed receptacle optionally include a formed protrusion that extends outward from the normal plane of the wall. If the optional protrusion is employed, the inner surface of the corresponding wall on the base of the tip dispenser should have a detent or opening to receive the formed protrusion when the clamshell tip container is set fully in place within the dispenser.

In one embodiment of the invention, the downward side of the lifting arm includes an angled section to guide the lifting arm laterally around the wing on the clamshell tip container when the lifting arm is rotated down as the cover of the dispenser is being closed. Each lifting arm is pivotally mounted to the dispenser; however, the bearing hole for the pivot pin is enlarged to enable the lifting arm to move laterally out of its normal pivot plane. Accordingly, when closing the dispenser cover, the cover pushes the lifting arms, and rotates them downward so that the angled sections ride against the overhanging wings. The lifting arms are in turn guided around the respective overhanging wings as the lifting arms are rotated past the overhanging wings. A centering angle helps to center the lifting arm below the respective overhanging wing once the lifting arm is past the respective wing and the dispenser cover is closed against the rim of the dispenser base. Other suitable ways of returning the lifting arm below the overhanging wing may also be employed.

In one exemplary embodiment of the invention, the thermoformed clamshell tip container sits with the bottom of the receptacle on the floor of the dispenser, such that vertical support for the tip deck is normally provided by the walls of the thermoformed container. This configuration enables more tolerance for the lifting arms on the dispenser below the respective overhanging wings on the thermoformed container to facilitate reliable operation. It is desired that the walls of the of the dispenser base have support stanchions on the inside to provide lateral support to the sidewalls of the lower receptacle of the thermoformed clamshell.

Another aspect of the clamshell container addresses the need to have a reliable locking mechanism. The rims of the receptacle and the lid do not have an interference fit as is common with other thermoformed containers because the dispenser needs to open and close the lid repeatedly. Accordingly, a hinged locking tab is used to latch the lid closed to the front wall of the lower receptacle of the clamshell container. In one embodiment of the invention, the clamshell container uses a particularly reliable latching mechanism. The latching mechanism includes a formed catch detent on the front sidewall of the lower receptacle. The catch detent has a base wall and sidewalls extending outward from the base wall. Each sidewall has a proximal portion adjacent the base wall and a distal portion. The distance between the respective distal portions is less than the distance between the respective proximal sections to form interference for the operation of the catch. A hinged locking tab is provided along a lower edge of the front wall of the lid. The locking tab has a formed engagement protrusion that engages with the formed catch detent on a front wall of the lower receptacle in order to releasably close the lid. The formed engagement protrusion includes a pair of latch bosses, each extending laterally from one side of the engagement protrusion. The distance between the respective distal portions of the sidewalls of the catch detent is less than the full span between the latch bosses; however, the latch bosses reside between the respective proximal portions of the sidewalls of the catch detent when the locking tab is in a closed position. When the locking tab is pushed closed, the engagement protrusion and the laterally extending latch bosses on the locking tab press through the opening between the distal portions of the catch detent on the lower receptacle. The distal portions of the catch detent, on the other hand, hold the engagement protrusion, the laterally extending latch bosses and the entire locking tab in place when the locking tab is closed. Having the latching interference along the sidewalls of the catch detent and the engagement protrusion of the locking tab enables a robust latching operation even if there is vertical offset due to imperfections in the operation of thermoformed hinges or otherwise. To open the locking mechanism, the locking tab is pulled to pull the engagement protrusion and the respective latch bosses past the distal portions of the catch detent. Desirably, the proximal wall is configured to provide space for movement of the locking tab when it is in the closed position. This makes it easier for the user to grab the locking tab in order pull on it to open the latch.

Another desirable feature is to configure both the tip container and the dispenser so that the pipette tip collars are presented at a level higher than the upper rim of the dispenser base and the upper rim of the clamshell receptacle. This enables the laboratory worker to mount tips using a multi-channel pipette with some of the channels overhanging the rim of the base.

The pipette tip rack system as described above enables the laboratory worker to repeatedly access pipette tips in the dispenser and cover the tips in the dispenser after one or more tips have been mounted to the pipette while the lab worker is pipetting reagents or samples. The system is configured primarily, as mentioned, to facilitate reliable one-touch operation so that the laboratory worker is able to keep the pipette in hand throughout the entire tip mounting process. As mentioned, a laboratory worker can even operate the dispenser with both hands otherwise occupied, e.g., activating the cover release and closing the dispenser cover with the back of a hand.

In another aspect of the invention, the invention pertains to the thermoformed clamshell tip container described above. For example, a clamshell container as described with overhanging wings on the rim of the lid, or the detents on the front of the lid to hold the locking tab in an open position.

In yet another aspect of the invention, the tip dispenser can also be used to store and dispense pipette tips held in only a tip deck, i.e., without the thermoformed clamshell tip container. In this aspect of the invention, the tip deck sits directly on the rim of the dispenser base. For example, refill tips sold loaded in tip decks but packaged in paperboard packaging can be loaded into the tip dispenser described above instead of loaded into a conventional tip rack. Similarly, loose pipette tips can be loaded into a used tip deck in the dispenser.

Other features and advantages of the invention should be apparent to those skilled in the art upon reviewing the drawings and the following description thereof.

BRIEF DESCRIPTION OF THE DRAWINGS

FIG. 12E shows an engagement protrusion on the locking tab engaged within a catch detent on the front wall of the lower receptacle.

DETAILED DESCRIPTION

Figure 1:
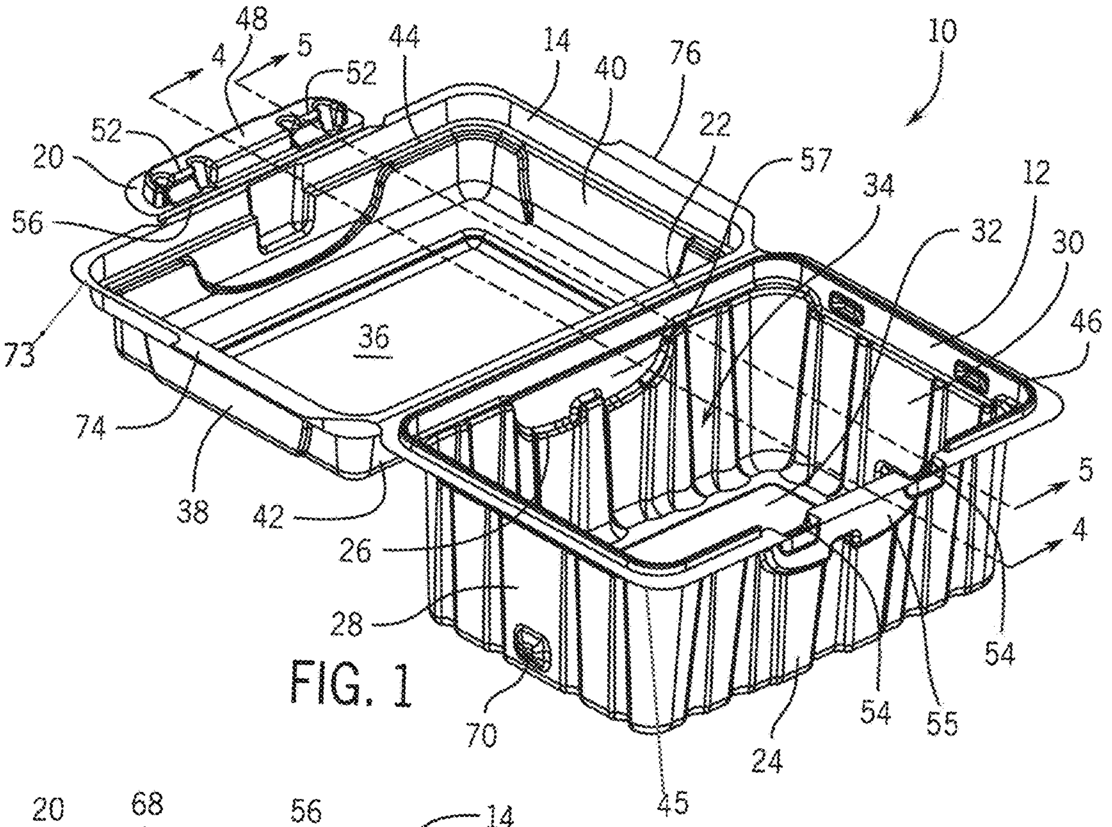
FIG. 1 is a perspective view of a clamshell tip container constructed in accordance with one exemplary embodiment of the invention, with its lid in the open position.

FIG. 1 illustrates a thermoformed clamshell tip container 10 that is constructed in accordance with an exemplary embodiment of the invention. The tip container 10 includes a lower receptacle 12 and an upper lid 14, which are connected together with a hinge 22. The lower receptacle 12 includes a front wall 24, a rear wall 26, lateral side walls 28, 30 and a bottom wall 32. The bottom wall 32, the lateral side walls 28, 30 and the front 24 and rear 26 walls define a well 34 for storing pipette tips. The bottom wall 32 has a raised flat, rectangular portion 33 surrounded by an outer portion 35 that supports the container 10 when it sits on a flat surface. The raised or recessed flat portion 33 fits over a raised rectangular portion 37 (FIG. 2) of the lid to facilitate stable multi-container stacking. The lateral side walls 28 and 30, and the front wall 24 and the rear wall 26 include strengthening ribs. The lid 14 on the clamshell tip container 10 includes a top wall 36, lateral side walls 38, 40, a rear wall 42 and a front wall 44. The lid 14 also includes a locking tab 20. The components in FIG. 1 of the clamshell tip container, namely the receptacle 12, the lid 14, the hinge 22 between the receptacle 12 and the lid 14, and the locking tab 20, are made of thermoformed plastic such as PET. A suitable gauge for the starting sheet or film is 0.025 inches for the container 10 shown in FIG. 1. A thicker gauge may be desired for taller containers configured to store longer pipette tips in order to account for increased stretching during the forming process.

An optional support ridge 46 extends substantially around the top of the walls 24, 26, 28 and 30 of the tip receptacle 12, except for across the middle portion of the front wall 24. As discussed in more detail below, the support ridge 46 supports a tip deck. The rim 45 along the middle portion of the front wall 24 includes indentations corresponding to the back side of locking projections 54 that extend downward from the rim 45.

Figure 2:
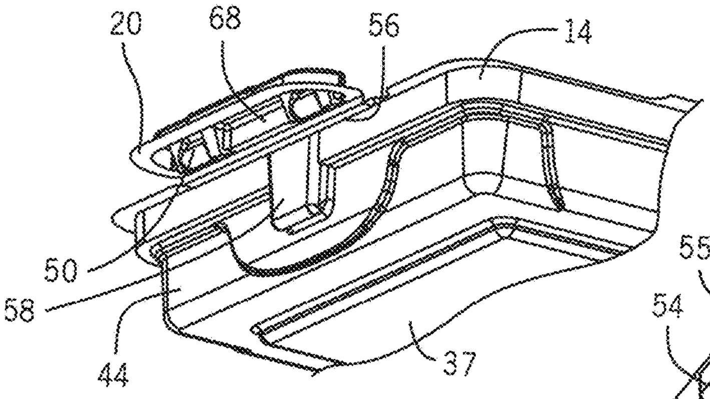
FIG. 2 is a detailed view of a portion of the lid of the clamshell tip container shown in FIG. 1.
Figure 3:
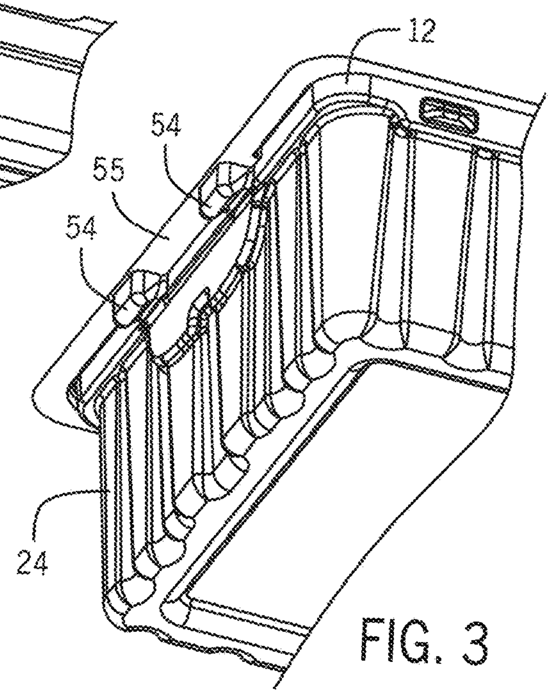
FIG. 3 is a detailed view of a portion of the lower tip receptacle of the clamshell tip container shown in FIG. 1.
Figure 4:
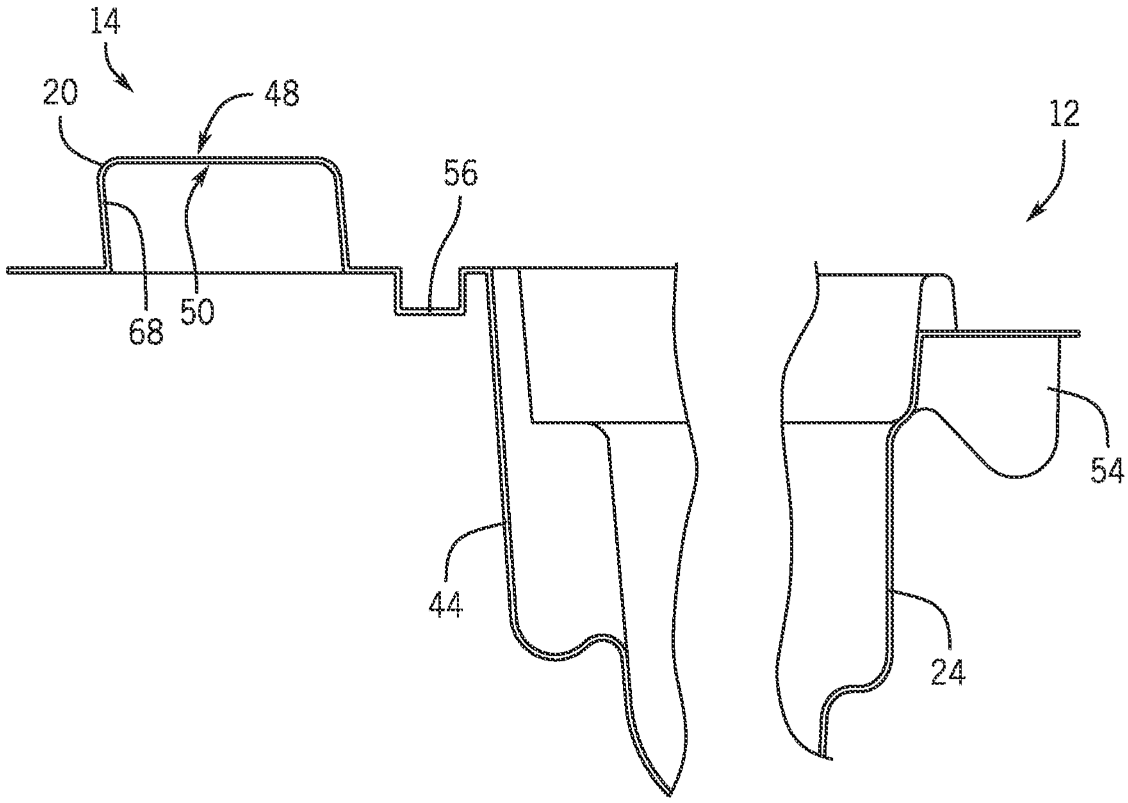
FIG. 4 is a sectional view taken along lines 4-4 in FIG. 1.
Figure 5:
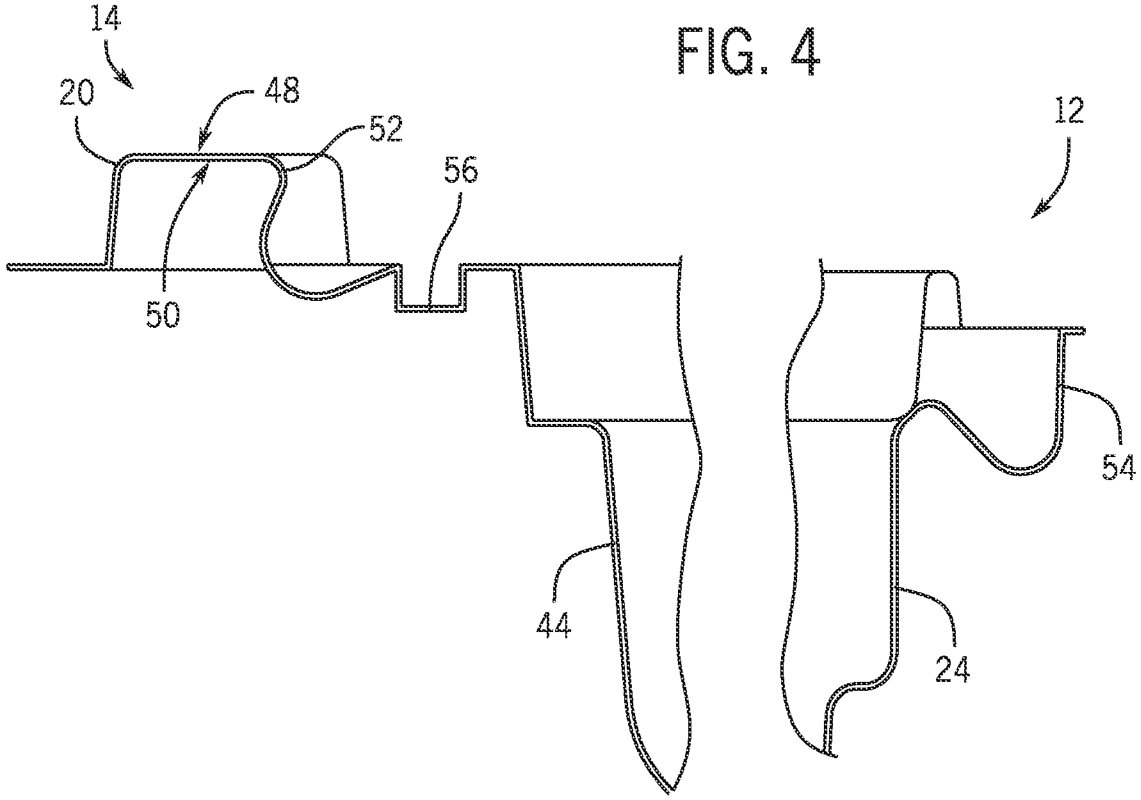
FIG. 5 is a sectional view taken along lines 5-5 in FIG. 1.
Figure 11C:
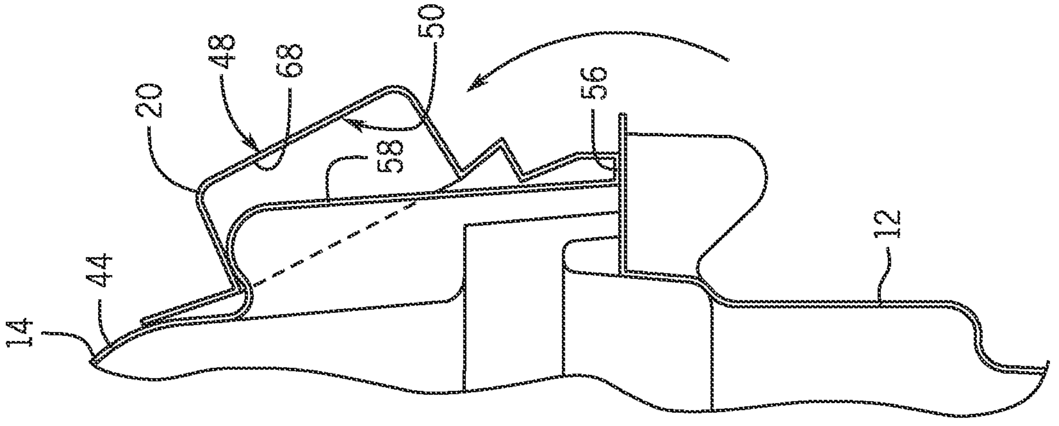
FIG. 11C is a sectional view taken along line 11C-11C in FIG. 10.
Figure 11B:
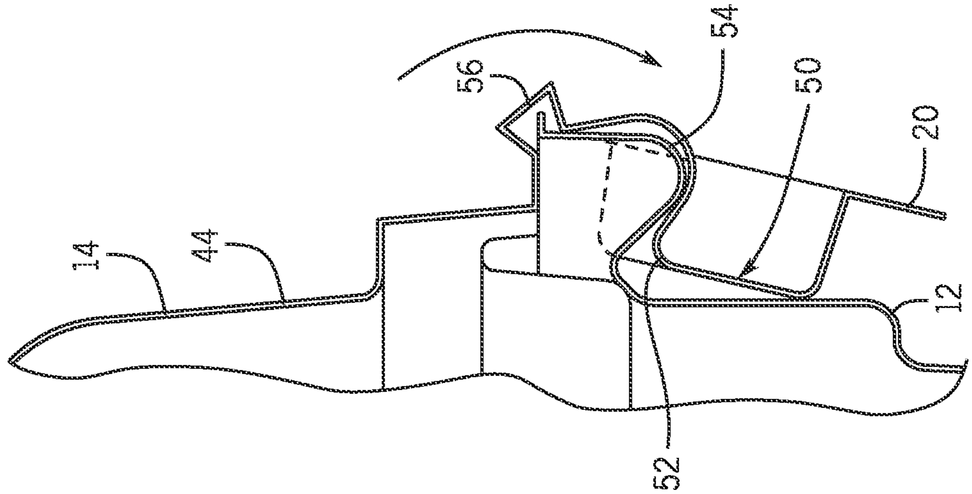
FIG. 11B is a sectional view taken along line 11B-11B in FIG. 9.
Figure 11A:
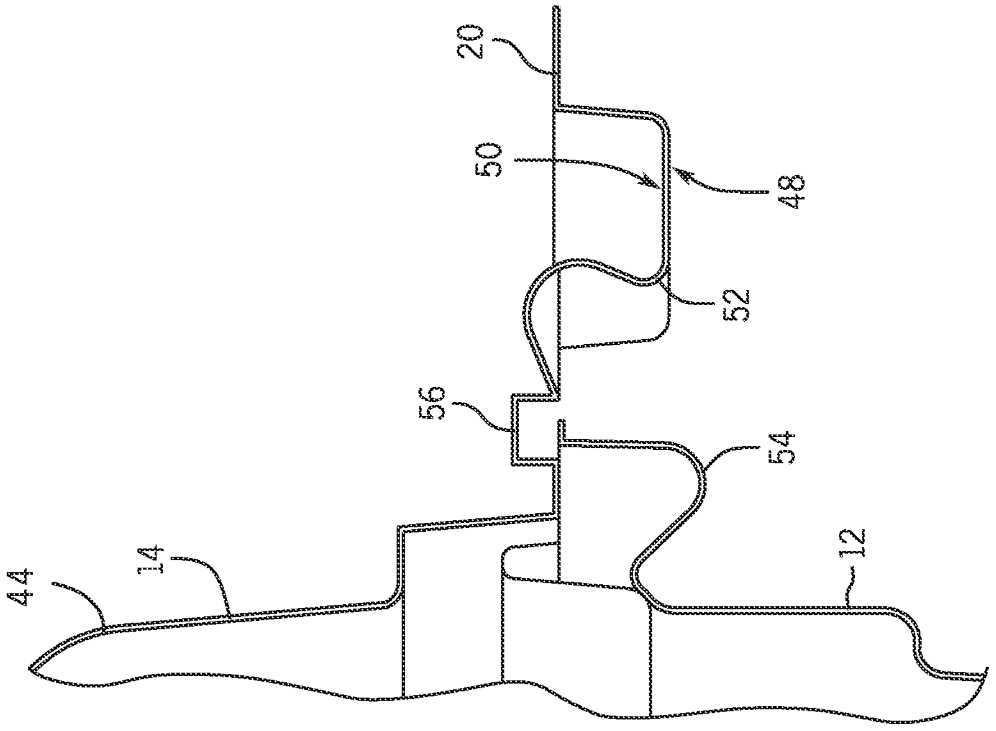
FIG. 11A is a sectional view taken along line 11A-11A in FIG. 8.
Figure 12A:
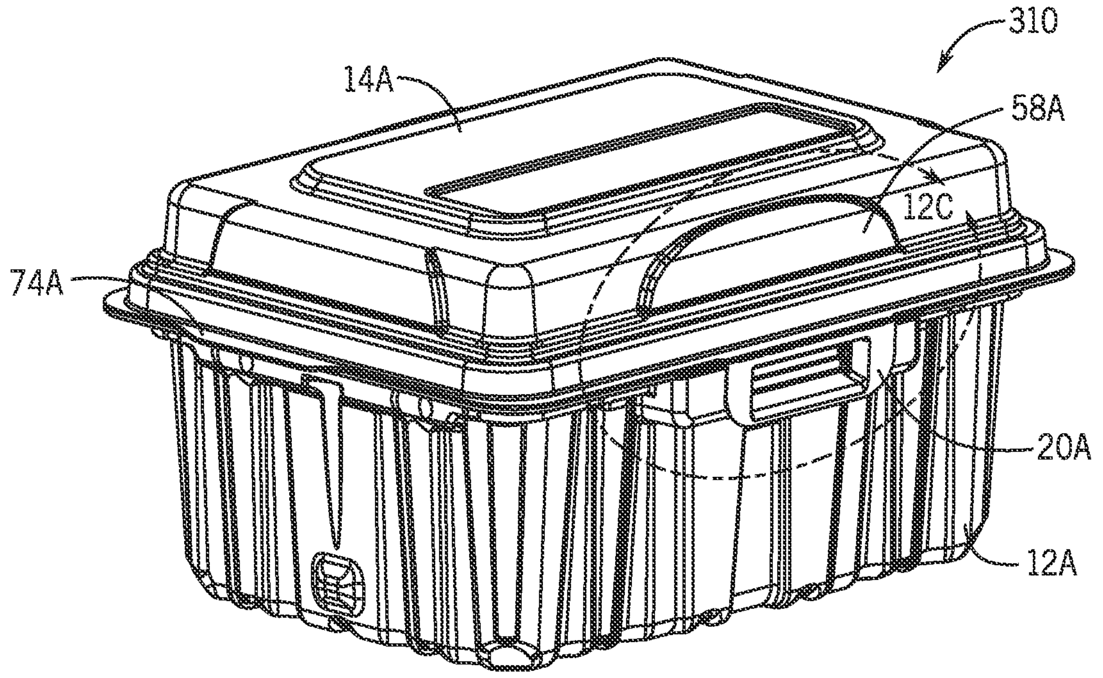
FIGS. 12A and 12B show a clamshell tip container constructed in accordance with another exemplary embodiment of the invention.
Figure 12B:
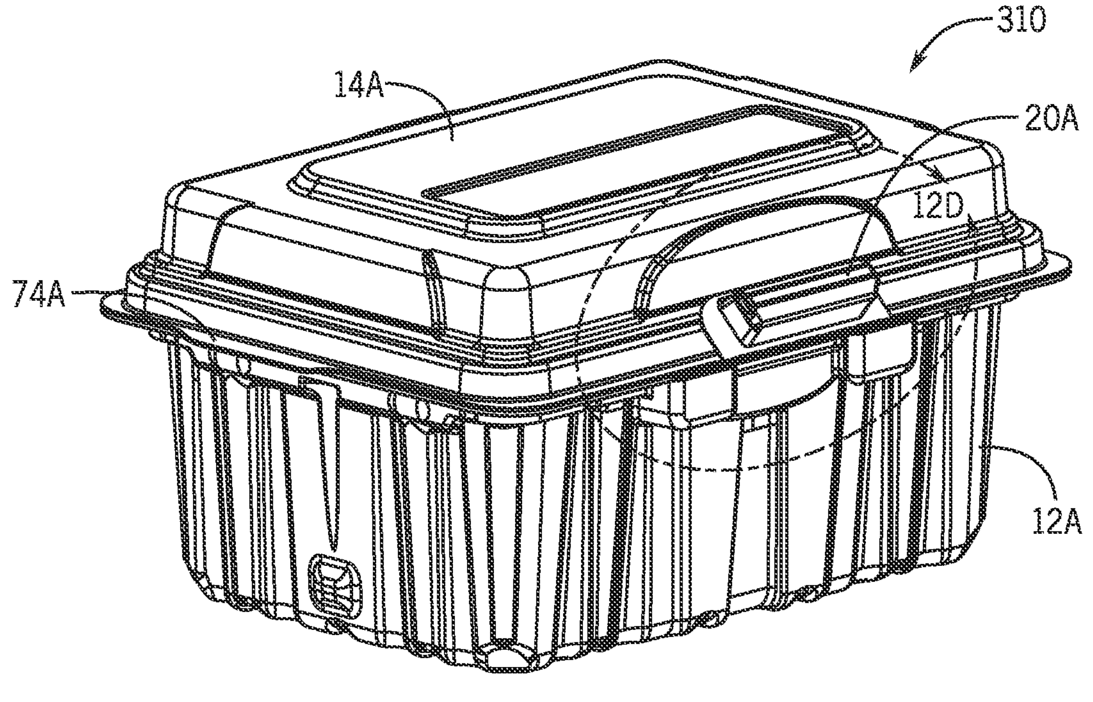

The locking tab 20 on the lid 14 is illustrated well in FIG. 2. FIG. 2 also shows the portion of the front wall 44 of the lid 14 that interacts with the back side 50 of the locking tab 20 to hold the locking tab in an up position. FIGS. 12A and 12B show another embodiment of the clamshell container 310 constructed in accordance with the invention that does not include this feature. FIG. 3 shows the portion of the front wall 24 on the lower receptacle 12 that interacts with the front side 48 (FIG. 1) of the locking tab 20 to lock the clamshell tip container 10 in a closed position. Referring not only to FIGS. 2 and 3, but also FIG. 1 and the sectional views shown in FIGS. 4 and 5, the locking tab 20 includes a front side 48 that is used to lock the lid 14 to the receptacle 12 and a back side 50 which fastens to detents on the front side of the lid 14 to hold the locking tab 20 up and out of the way. The term "detent" is used herein to refer to either an indentation in or a protrusion from the thermoformed tip container 10. As apparent to those skilled in the art, a protrusion from a thermoformed surface results in a corresponding indentation in the backside of the surface. A hinge 56 connects the locking tab 20 to the lower front edge of the lid 14. The locking tab 20 includes two locking detents 52 on its front side 48 which interact with the protrusions 54 extending downward from the upper rim 45 of the receptacle 12. The detent 58 extending from the front wall 44 of the lid 14 interacts with an indentation 68 on the back side 50 of the locking tab 20 between the detents 52 in order to hold the locking tab 20 against the front wall 44 of the lid 14. More detail of how the locking tab 20 locks the tip container 10 closed and how the locking tab 20 is held up against the front wall 44 of the lid 14 is described below with respect to FIGS. 8 through 11A-C.

Figure 6:
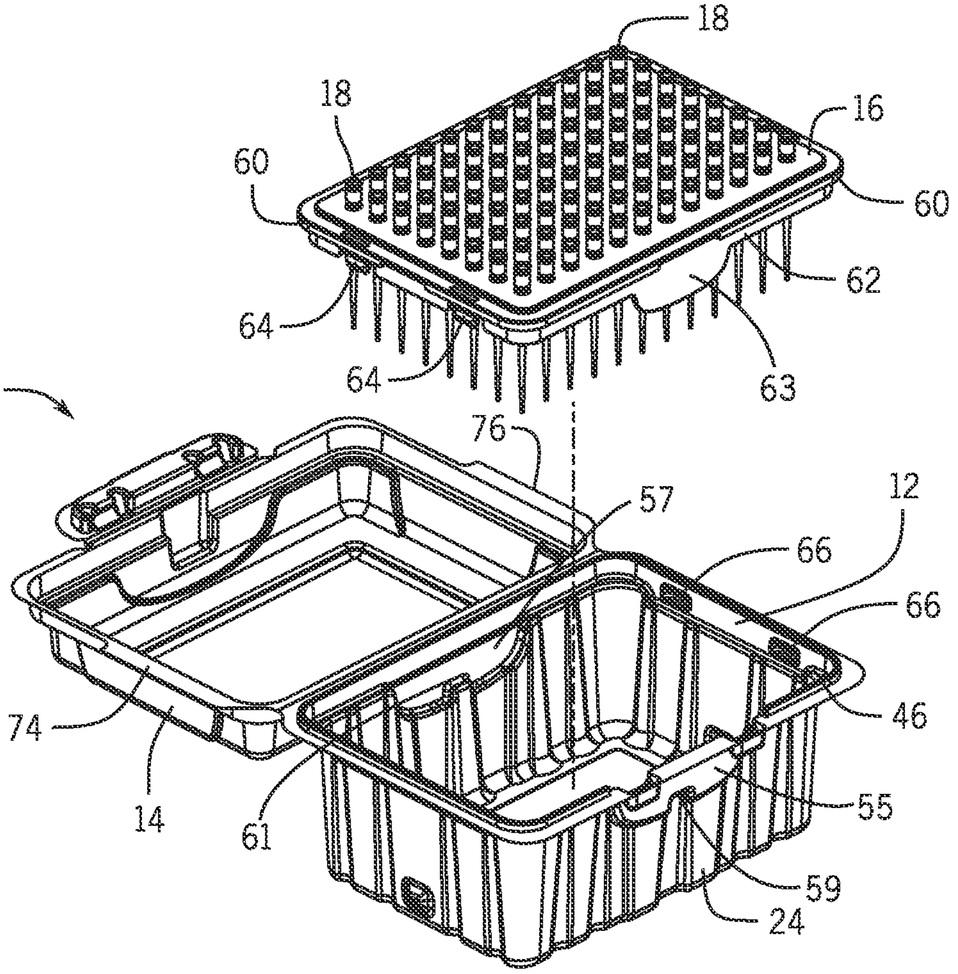
FIG. 6 is an assembly view of a tip deck loaded with an array of pipette tips being assembled into the clamshell tip container shown in FIG. 1.
Figure 7:
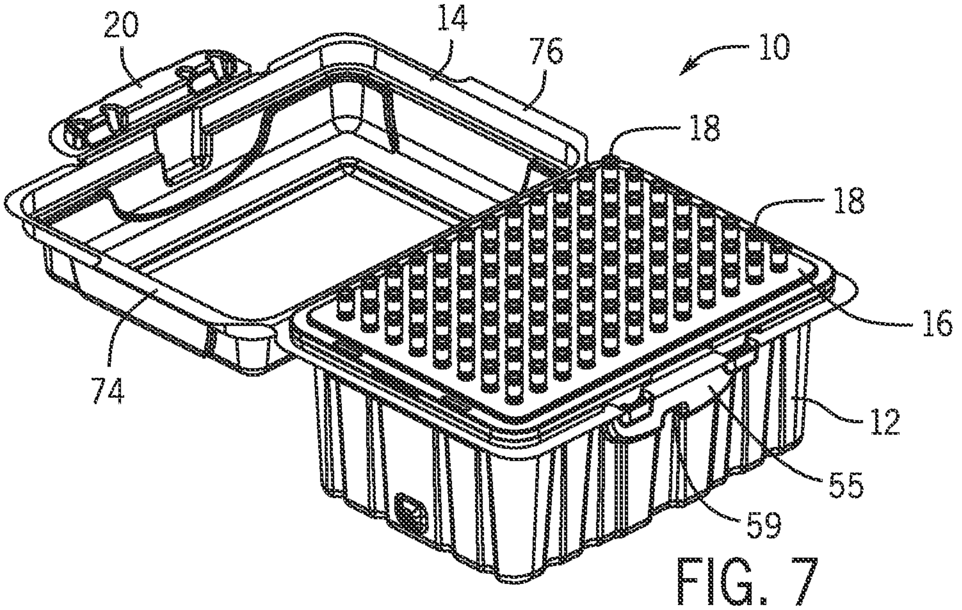
FIG. 7 shows the clamshell tip container of FIGS. 1 and 6 with the tip deck inserted and loaded with pipette tips.

Referring now to FIGS. 6 and 7, a tip deck 16 is shown loaded with pipette tips 18. The tip deck 16 as mentioned is desirably made of injection molded plastic, such as polypropylene, and is inserted into the receptacle 12 of the clamshell tip container 10. In the embodiment shown in the drawings, the tip deck 16 includes an 8×12 array of holes for holding 96 pipette tips 18. The respective holes are desirably spaced apart from one another at 9 mm in accordance with SBS format requirements. In other embodiments, more or fewer pipette tips 18 can be held at the same or different spacing. For example, 384 pipette tips may be held in a 16×24 array of holes spaced at 4.5 mm. The peripheral portions surrounding the array of holes on the tip deck 16 includes a brim 60 and a downwardly extending skirt 62. The brim 60 overhangs the skirt 62. As the tip deck 16 is inserted into the receptacle 12, the skirt 62 aligns with the opening in the receptacle 12 and the brim 60 rests on the support ridge 46 extending around the upper rim 45 of the receptacle 12, except as indicated previously in the area of the latch on the front wall 24 of the lower receptacle 12. A front support sleeve 63 extends down from the deck skirt 62 in the area of the latch on the front wall 24 of the lower receptacle 12. There is a similar support sleeve extending down from the rear of the deck skirt 62, which is not shown in the figures. The front wall 24 of the lower receptacle 12 includes a clearance detent 55 into which the front support sleeve 63 sits when the tip deck 16 is in place. There is a similar clearance detent 57 on the rear wall 26 of the lower receptacle for the rear support sleeve. Each clearance detent 55, 57 has a reinforced foot 59, 61 in the respective front 24 and rear 26 walls support the support sleeves on the tip deck 16 to prevent center collapse during tip loading. As can be seen in FIGS. 6 and 7, the support ridge 46 and the brim 60 are at a height above any other part of the receptacle 12. This enables a laboratory worker using a multi-channel pipette to conveniently access the tips 18 even if some of the channels on the pipette are overhanging. Still referring to FIGS. 6 and 7, the exemplary tip deck 16 also includes securing fingers 64 which snap into detents 66 on the upper rim 45 of the receptacle 12 to help hold the tip deck 16 in place. FIG. 6 shows securing finger 64 on one lateral side of the tip deck 16 but it should be understood that similar securing fingers are located on the other lateral side of the tip deck 16. Similarly, FIG. 6 shows detent 66 on the inside surface of the upper rim 45 along one lateral side of the receptacle 12 but it should be understood that similar detents are located on the other lateral side.

FIG. 7 shows the clamshell tip container 10 open such that the pipette tips 18 are accessible. A laboratory worker may choose to open the lid 14, and access the pipette tips 18 as shown in FIG. 7 without the use of a dispenser, although it is preferred in accordance with the invention to use a dispenser 110 the same as or similar to the dispenser 110 described in FIGS. 13 through 36.

Figure 8:
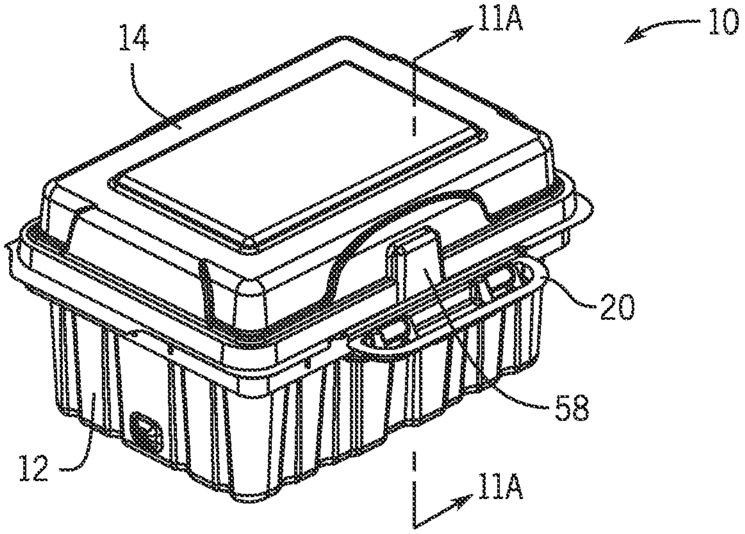
FIG. 8 is a perspective view of the clamshell tip container of FIGS. 1 through 7 with the locking tab open but hanging in a neutral position.
Figure 9:
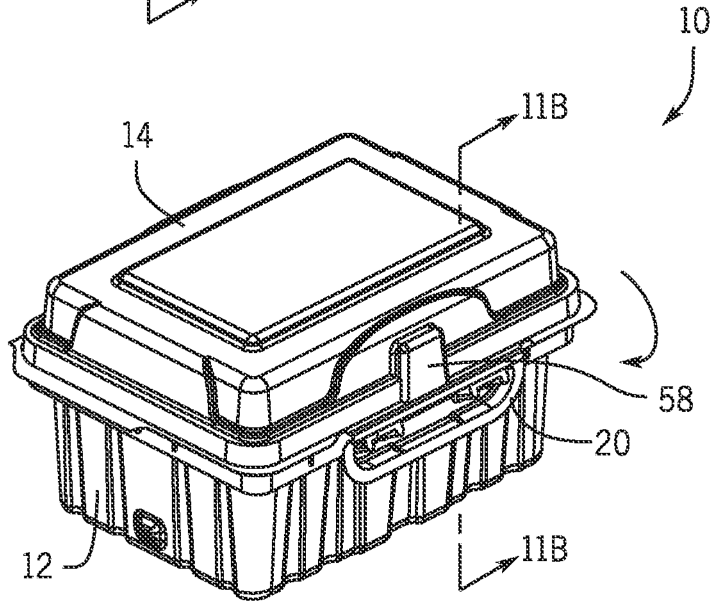
FIG. 9 is a view of the clamshell tip container similar to FIG. 8 with the locking tab friction fit against one or more detents on the front wall of the lower receptacle in order to latch the clamshell tip container shut.
Figure 10:
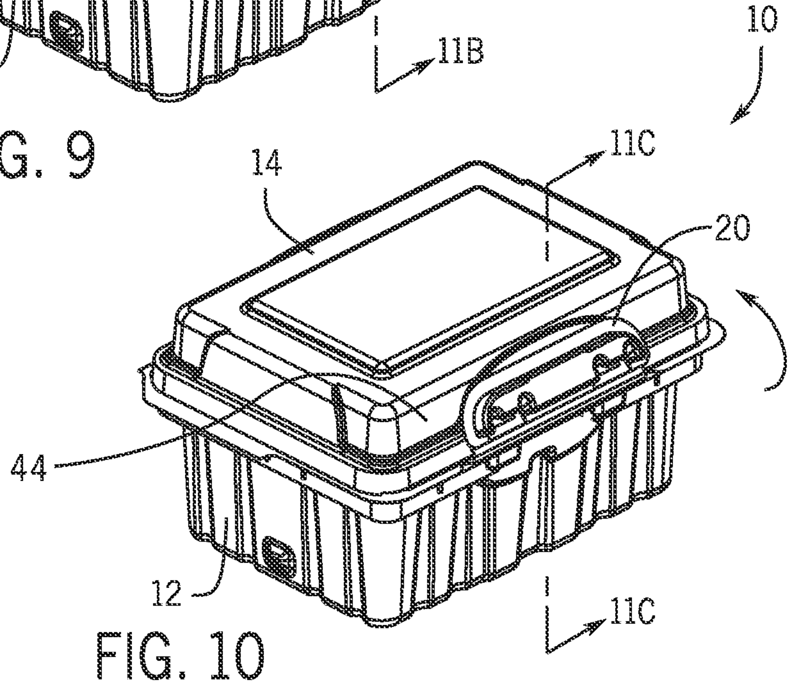
FIG. 10 is a view of the clamshell tip container similar to FIGS. 8 and 9 in which a backside of the locking tab is friction fit against one or more detents on the front wall of the lid to stow the locking tab in an up position.

FIG. 8 shows the clamshell tip container 10 closed with the locking tab 20 released but in a neutral position. In FIG. 9, the locking tab 20 is pressed downward in order to lock the lid 14 to the receptacle 12. In FIG. 10, the locking tab 20 has been released and also pushed upward to be held against the front wall 44 of the lid 14. The sectional views in FIGS. 11A-11C explain these interactions in more detail. FIG. 11A corresponds to FIG. 8 and shows the locking tab 20 extended in a released but neutral position. As mentioned, the hinge 56 connects the locking tab 20 to the lid 14. The front side of the locking tab 48, which is the downward side in FIG. 11A, includes protrusion 52 which forms an interference fit with protrusion 54 on the receptacle 12 to close the tip container 10. FIGS. 9 and 11B show the locking tab 20 in the closed position. Note that the protrusions 52 and 54 form an interference fit to keep the container 10 locked shut. To unlock the container 10, the user lifts up on the locking tab 20 and rotates it upward first to the neutral position as shown in FIGS. 8 and 11A and then if it is desired to hold the locking tab 20 upward against the front wall 44 of the lid 14 into the position shown in FIGS. 10 and 11C. Referring to FIGS. 10, 11C as well as FIG. 2, the back side 50 of the locking tab 20 includes an indentation 68 between the locations of the protrusions 52 on the front side 48 of the locking tab 20. The front wall 44 of the lid 14, as previously mentioned, includes a protrusion 58. When the locking tab 20 is rotated upward and pushed against the front wall 44 of the lid 14, the detent 68 friction fits over the protrusion 58 on the front wall 44 of the lid 14 and holds the tab 20 against the front lid 14. The position shown in FIGS. 10 and 11C is useful when the tip container is loaded into the tip dispenser inasmuch as it conveniently keeps the locking tab 20 stowed out of the way when loading the thermoformed tip container 10 into the tip dispenser.

Figure 12C:
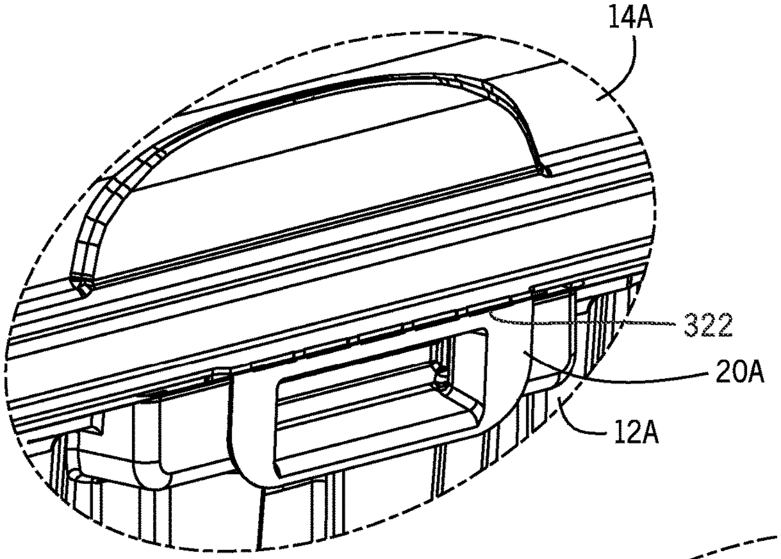
FIG. 12C shows a detailed view of the area encircled by arrow 12C-12C in FIG. 12A, and shows features of a locking tab.
Figure 12D:
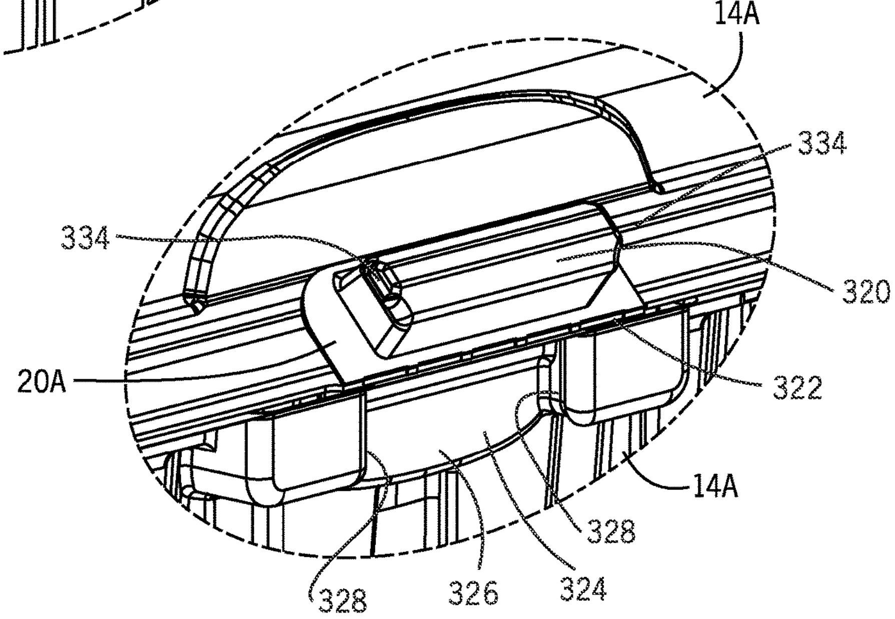
FIG. 12D shows a detailed view of the area encircled by arrow 12D-12D in FIG. 12B and shows features of the locking tab and a catch detent on the lower receptacle of the container.
Figure 12E:
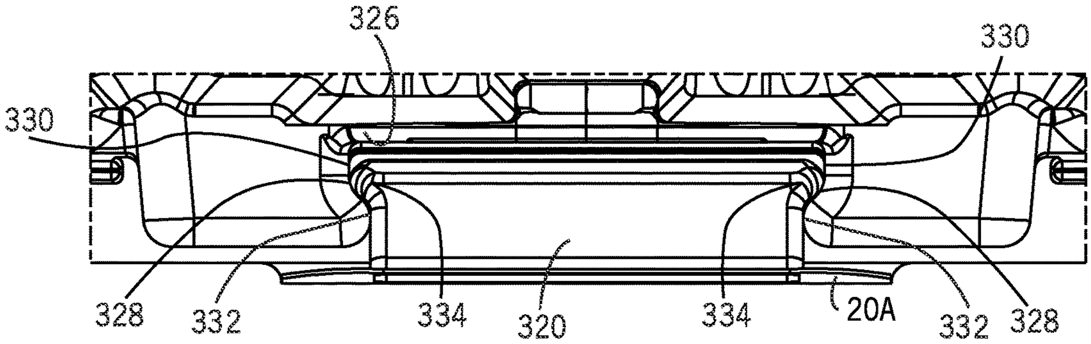
FIG. 12E is detailed bottom view of the locking tab in a closed position as shown in FIG. 12C.

FIGS. 12A and 12B show a thermoformed clamshell tip container 310 constructed in accordance with another exemplary embodiment of the invention. The clamshell tip container 310 is similar to the clamshell tip container 10 described in FIGS. 1 through 11A-11C, except it does not include a detent 58 on the container lid 14A or an indentation 68 on the backside of the locking tab 20A configured to latch over the detent. Many features of the thermoformed clamshell 10A shown in FIGS. 12A and 12B, such as the overhanging wings 74A on the lid 14A of the container 310, are the same as described with respect to the clamshell container 10 described in FIGS. 1 through 11A-11C. When using the container 310 in FIGS. 12A and 12B, the locking tab 20A is released from the position in FIG. 12A to free the lid 14A from the lower receptacle 12A, and locking tab 12A is then preferably held back in the position shown in FIG. 12B against the front 58A of the lid 14A when loading the tip container 310 into the dispenser 110, in order to stow the locking tab 20A out of the way when the dispenser 110 is in use. While not normally preferred, it is possible to use the tip container 310 in the dispenser 110 with the locking tab 20A released, hanging downward and not folded into the position shown in FIG. 12B. Referring to FIGS. 12C-12E, the locking tab 20A includes an engagement protrusion 320 that extends longitudinally parallel to the hinge 322 attaching the locking tab 20A to the front rim 73 of the lid 14A. The hinge 322 is preferably perforated so that the hinge axis for locking tab 20A is well defined, which in turns helps the locking tab 20A reliably latch into a catch detent 324 on the front wall of the lower receptacle 12A. The catch detent 324 is elongated and generally sized so that the engagement protrusion 320 catches within the detent 324 when the locking tab 20A is pressed downward as shown in FIG. 12C. FIG. 12E shows the locking tab 20A in the closed position as viewed from underneath the latch shown in FIG. 12C. Referring now to FIGS. 12D and 12E, the catch detent 324 is defined by a base wall 326 and two side lateral walls 328. Each lateral sidewall 328 includes a proximal portion 330 adjacent the base wall 326 and a distal portion 332. The distance between the respective proximal portions 330 is greater than the distance between the respective distal portions 332. A latch boss 334 extends laterally from each side of the engagement protrusion 320 on the locking tab 20A. The full span between the latch bosses 334 on the engagement protrusion 320 on the locking tab 20A is greater than the distance between the distal portions 332 of the sidewalls 328 of the catch detent 320 on the lower receptacle 12A. When the locking tab 20A is pressed downward into the closed position, the latch bosses 334 are pressed through the opening between the distal portions 332 of the sidewalls of the catch detent 320. The distance between the proximal portions 330 of the sidewalls of the catch detent 320 is the same or slightly larger than the full span between the latch bosses 334, as shown for example in FIG. 12E. The interference between the latch bosses 330 extending laterally from the engagement protrusion 320 on the locking tab 20A and the distal portions 332 of the sidewall of the catch detent 320 on the lower receptacle keeps the lid 14A closed unless the locking tab 12A is pulled with sufficient force for the latch bosses 330 to clear the distal portions 332 of the sidewall of the catch detent 320. Note that the length of the proximal sidewall portions 330 is desirably sufficient to provide room for the engagement protrusion 320 move slightly within the catch detent 324 when the locking tab 20A is closed. This clearance makes it easier for the user to grab the locking tab 20A when it is desired to open the latch. The described latching mechanism is particularly robust and well suited for repeated opening and closing. The vertical height of the sidewall 328 (in contrast to the depth of the sidewalls 328) can be modified, if necessary, to account for inconsistent vertical displacement of the locking tab 12A via the hinge 322 when it is closed.

Figure 14:
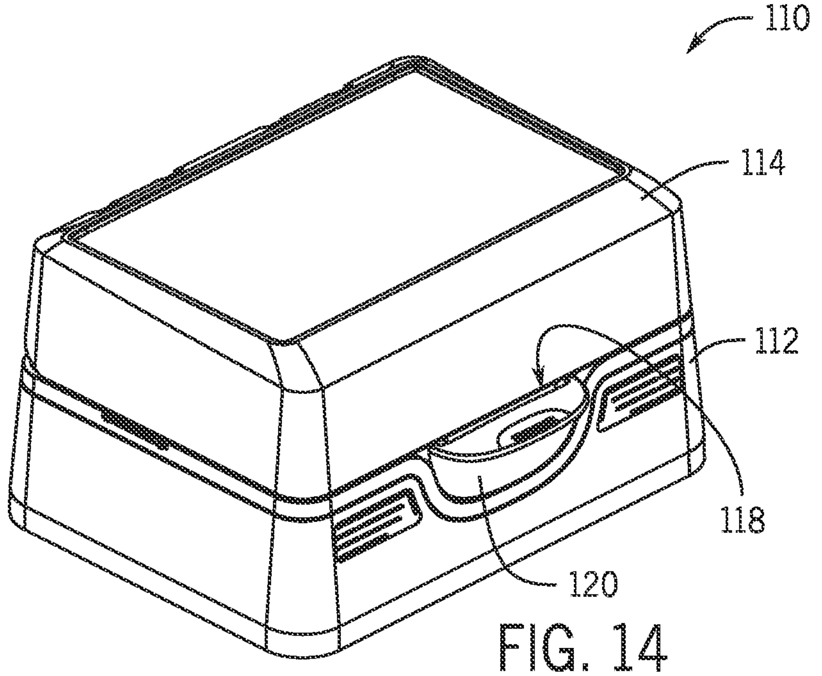
FIG. 14 shows a perspective view of the tip dispenser in a closed position.
Figure 15:
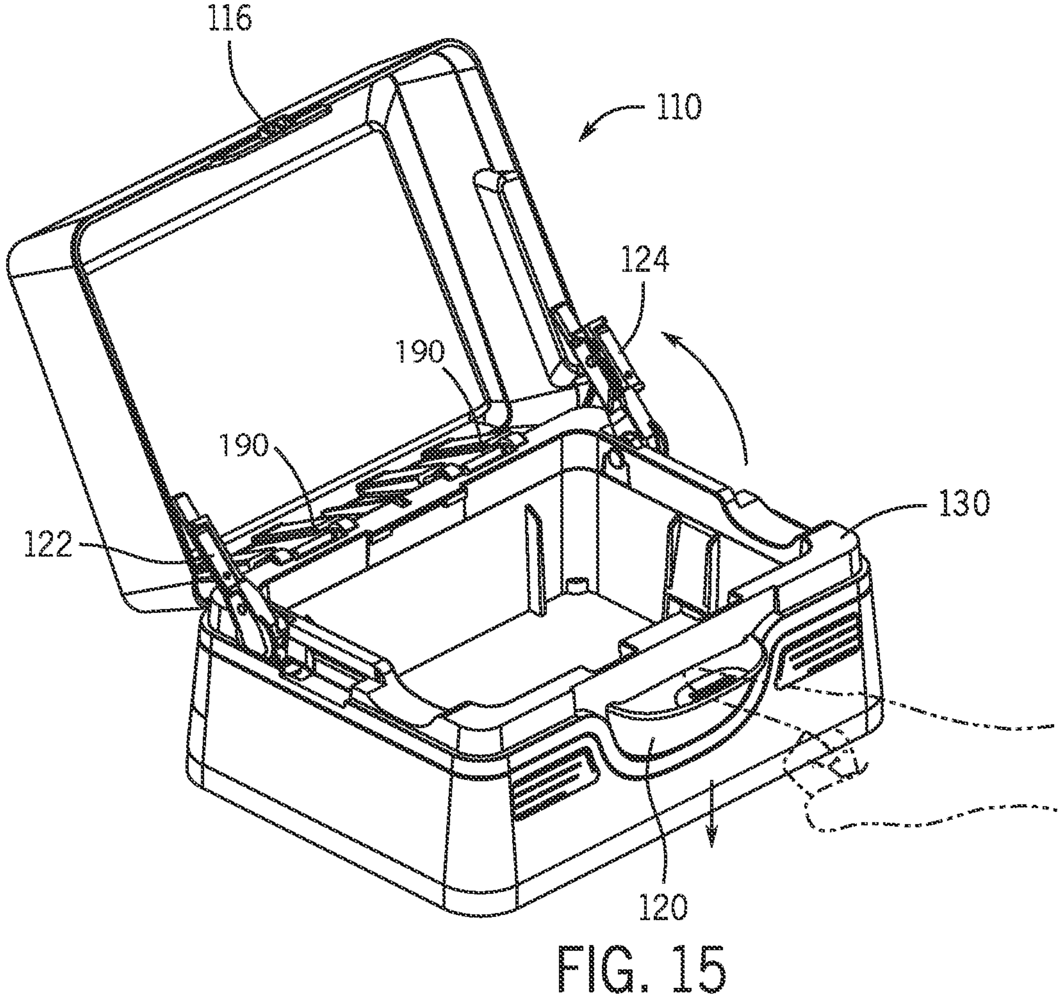
FIG. 15 shows a perspective view of the tip dispenser shown in FIGS. 13 and 14 in an open position.

FIGS. 13 through 30A-D illustrate a tip dispenser 110 constructed in accordance with an exemplary embodiment of the invention. Referring first to FIGS. 14 and 15, the tip dispenser 110 includes a base 112 and a cover 114. A front wall of the cover 114 includes a latching tab 116 that is received into a releasable latch 118 on the base 112 in order to latch the cover 114 closed to the base 112. It is preferred that the latch 118 include a depressible button 120 on the front wall of the dispenser base 112 which releases the latch when depressed. As shown for example in FIG. 15, the dispenser 110 also includes first and second lifting mechanisms 122, 124 that automatically lift the cover 114 when the latch 118 is released.

Figure 13:
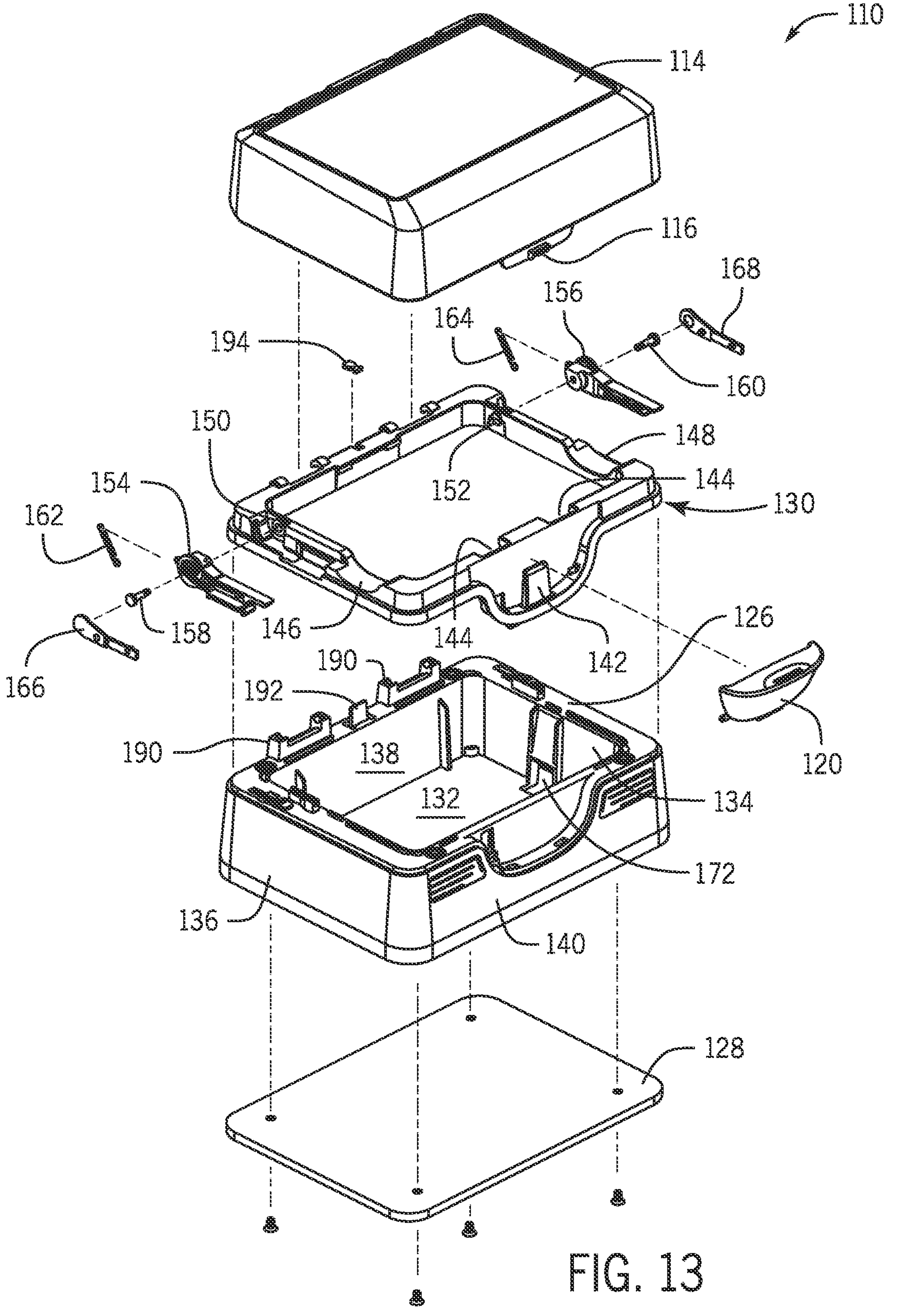
FIG. 13 is an assembly view of a tip dispenser constructed in accordance with an exemplary embodiment of the invention.

The components of the tip dispenser 110 are shown best in the assembly view of FIG. 13. The dispenser 110 includes a main frame 126 made for example from an injection molded plastic such as polycarbonate. A weighted plate 128 is attached to the bottom of the main frame 126, e.g. with screws fastened to threaded fittings molded into the bottom of the main frame 126. The weighted plate 128 is preferably made of anodized aluminum, but other materials may be used. Rubber feet can also be attached to the bottom of the weighted plate 128. While the weighted plate 128 is optional, it provides additional stability and confidence to the laboratory worker that the dispenser will stay in place without being held by the user's off hand. As an alternative to the weighted plate 128, weighted plates or other weights can be attached on top of a bottom plate made of plastic, e.g., to make manufacturing easier or less expensive.

A molded rim component 130 is also attached to the main frame 126. Rim component 130 is also desirably made of injection molded plastic such as polycarbonate, or acetal. The main frame 126 of the base 112 includes a bottom wall or floor 132, lateral side walls 134, 136, a rear wall 138 and a front wall 140. The inside surface of the floor 132 and the walls 134, 136, 138 and 140 forms a basin into which the clamshell tip container 10 described in FIGS. 1 through 11A-11C, or the clamshell container 310 described in FIGS. 12A and 12B, can be set. The upper rim component 130 includes a latch spring tongue 142 which cooperates with the button 120 to secure the latch tab 116 on the cover. The button 120 snaps into place on the rim component 130 via molded pins. The pivot axis of the button 120 is at a height above the base of the spring tongue 142. When the button 120 is snapped into place, the spring tongue 142 biases the button 120 to its closed position, with the top of the button rotated towards and nearly against the front surface of the rim component 130. The latching tab 116 on the cover 114 includes a beveled latching finger. When the cover 114 is pushed down, a lower beveled surface on the latching finger pushes the top of the button 120 away from the rim component 130 against the spring bias, until the finger clears the top surface of the button 120. Then, the bias of the spring tongue 142 rotates the button 120 into a closed position with the finger latched under the top wall of the button 120. To open the latch, the button 120 is pushed downward against the spring bias to release the finger. As mentioned, cover 114 can be closed and the latch can be released to open the cover 114 by the user even if both of the user's hands are full, e.g., by using the back of the user's hand. This one-touch control encourages the use of the cover, which in turn reduces the risk of contamination.

The inside of the front part of the rim component 130 includes cutouts 144 which provide clearance for the locking projections 54 on the receptacle 12 for the clamshell tip container 10. The front part of each side of the rim component 130 also includes finger openings 146, 148, to provide access by a laboratory workers' thumb and finger to pull the clamshell tip container 10 from the dispenser 110. The rear portions of the sides of the rim component 130 include recessed mounts 150, 152 for the lifting mechanisms 122, 124. Each lifting mechanism includes a lifting arm 154, 156, a pivot screw 158, 160 as well as an extension spring 162, 164 and a lifting arm cover 166, 168. The lifting arms and cover, as well as the button are desirably made of molded plastic such as acetal.

Figure 32:
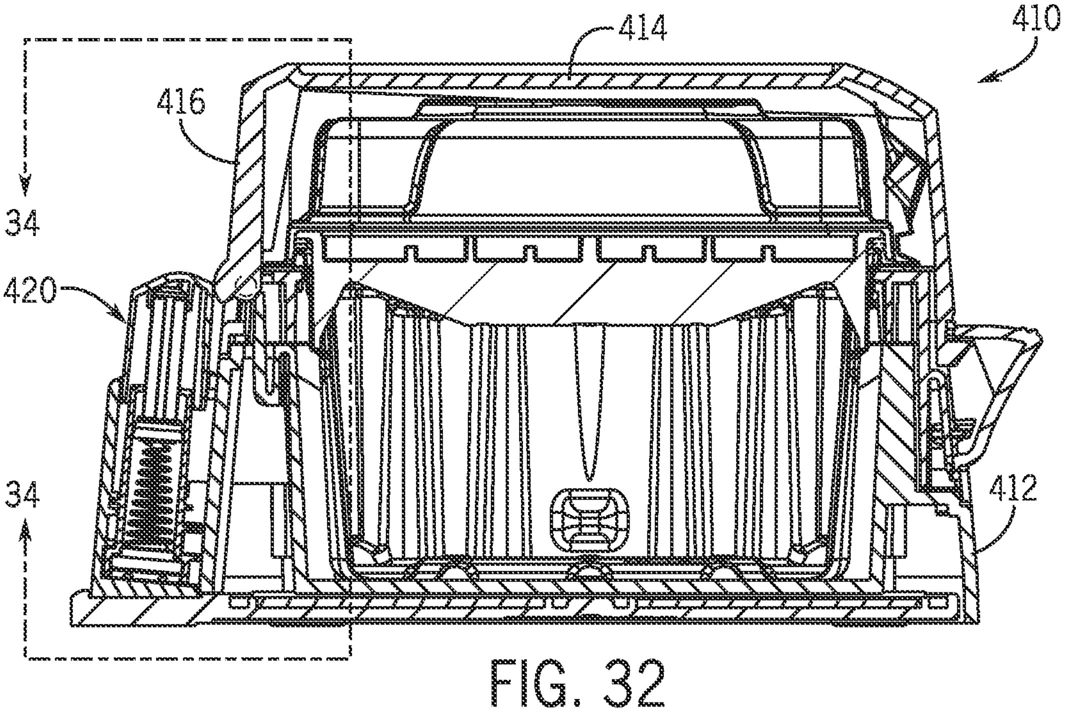
FIG. 32 is a sectional view taken through the tip dispenser shown in FIG. 31, with a clamshell container inside as well.

The cover 114 is desirably made of injection molded clear polycarbonate. A pair of hinges pivotally connect the rear wall of the cover 114 to the rear wall of the base 112. The main frame 126 includes a pair of hinge mounts 190 along the top of the rear wall 138, as well as an upstanding dampening tab 192. The purpose of the dampening tab 192 is to slow the rearward motion of the cover and soften the feel when opening the dispenser cover 114. The dampening tab 192 interferes with the rear wall of the cover 114, or a projection from the rear wall of the cover 114, when the cover approaches a fully open rotation. The dampening tab 192 can be made resilient to dampen the contact. Additionally, or alternatively, an elastomeric bumper 194 can be used to dampen the contact. FIG. 32 illustrates another embodiment of the tip dispenser having a dampening piston which can be useful when more substantial dampening is desired. Alternatively, if one so desires, the tip dispenser avoid the need for a dampening mechanism by employing a lifting mechanism that inherently provides a slow, controlled opening motion.

Figure 16:
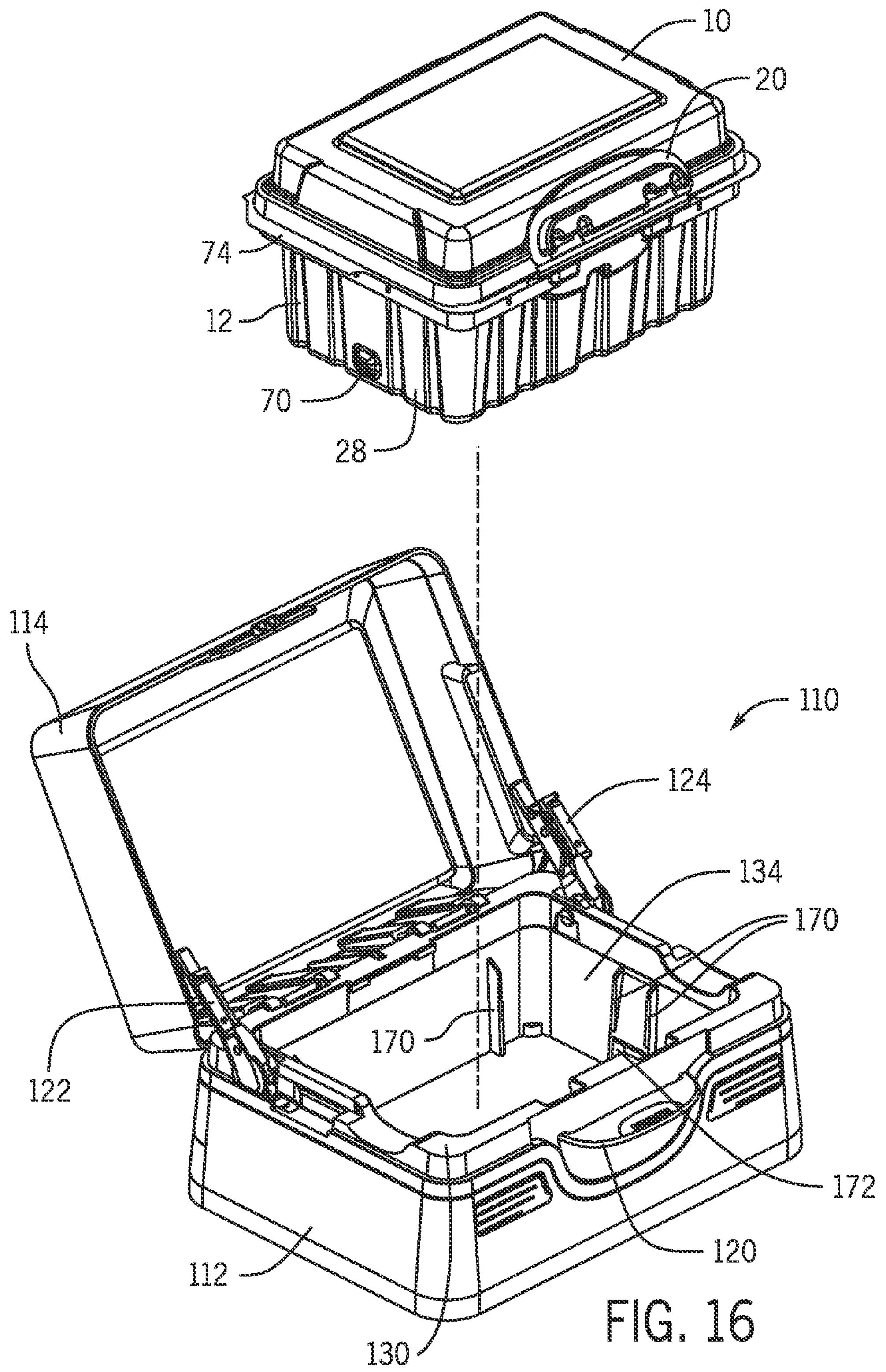
FIG. 16 shows the clamshell tip container of FIGS. 7 through 10 with the locking tab stowed in an up position ready to be loaded into the open tip dispenser of FIG. 14.

FIGS. 14 through 25 show the steps involved in loading and using the dispenser 110. FIG. 14 shows an empty tip dispenser 110 in a closed position. FIG. 15 shows a user pressing the button 120 on the front of the dispenser 110 to open the empty dispenser 110. Referring now to FIG. 16, the locking tab 20 as mentioned previously, can be held in the up position against the front wall of the lid 14 of the clamshell tip container 10 prior to setting the container 10 into the tip dispenser 110 if the clamshell container 10 described in FIGS. 1 through 11A-11C is used. Alternatively, if the clamshell container 310 described in FIGS. 12A-12B is used, the locking tab 20A is tucked under the cover of the dispenser 110 by the user when the tip container is being loaded into the dispenser 110, i.e., prior to the step shown in FIG. 21. Or, as mentioned above, the locking tab 20A can be released and allowed to hang downward, which may require that the lid 14 of the clamshell container 10 be slightly ajar when the dispenser cover 114 is closed. The walls within the dispenser basin desirably include several stanchions 170.

Figure 17:
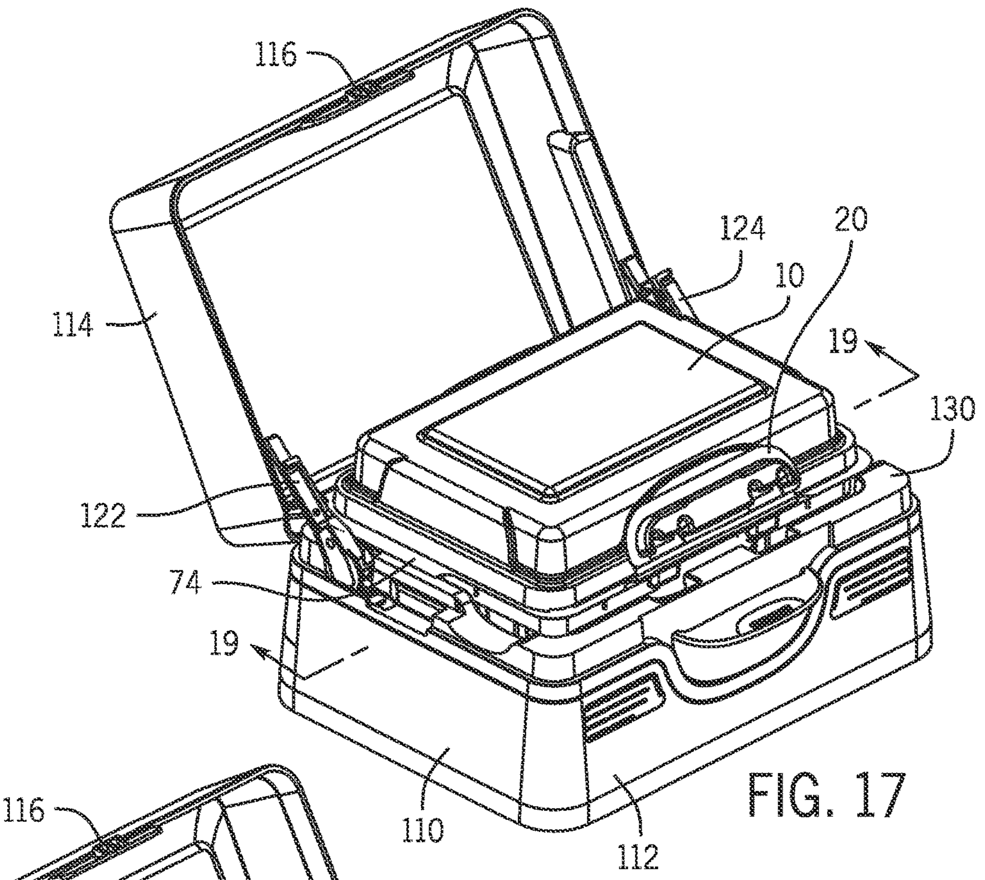
FIG. 17 shows the clamshell tip container being set preliminarily in the tip dispenser.
Figure 18:
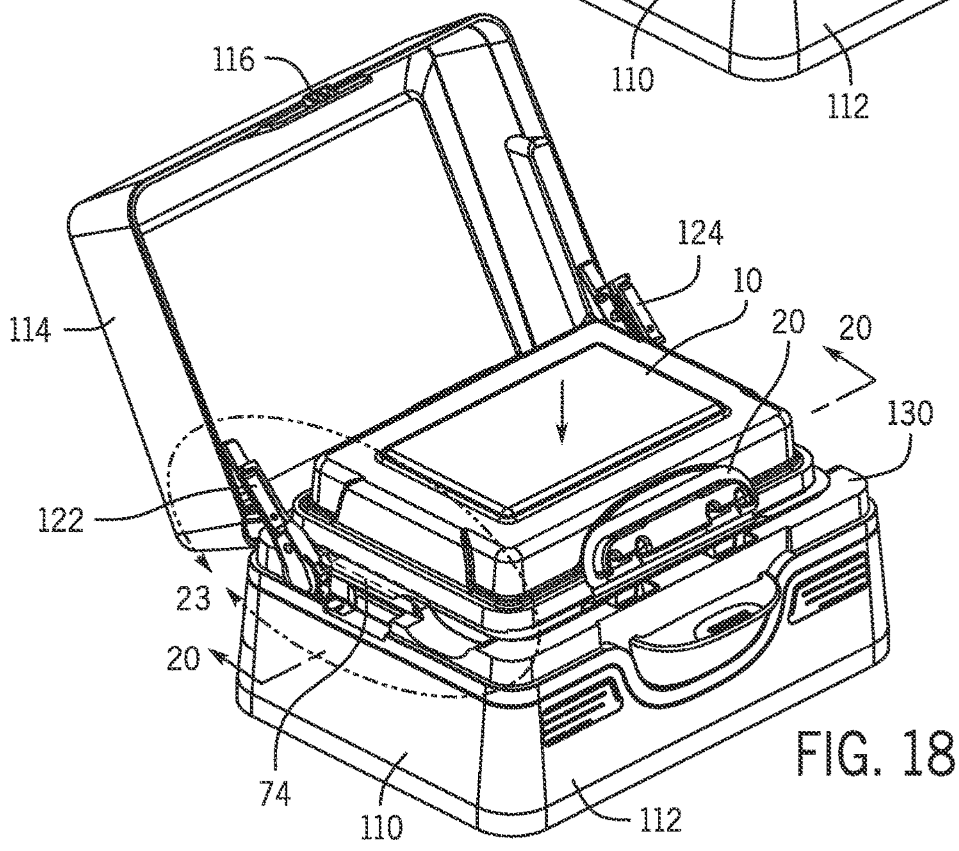
FIG. 18 shows the clamshell tip container being pushed down to be fully loaded into the tip dispenser.
Figure 19:
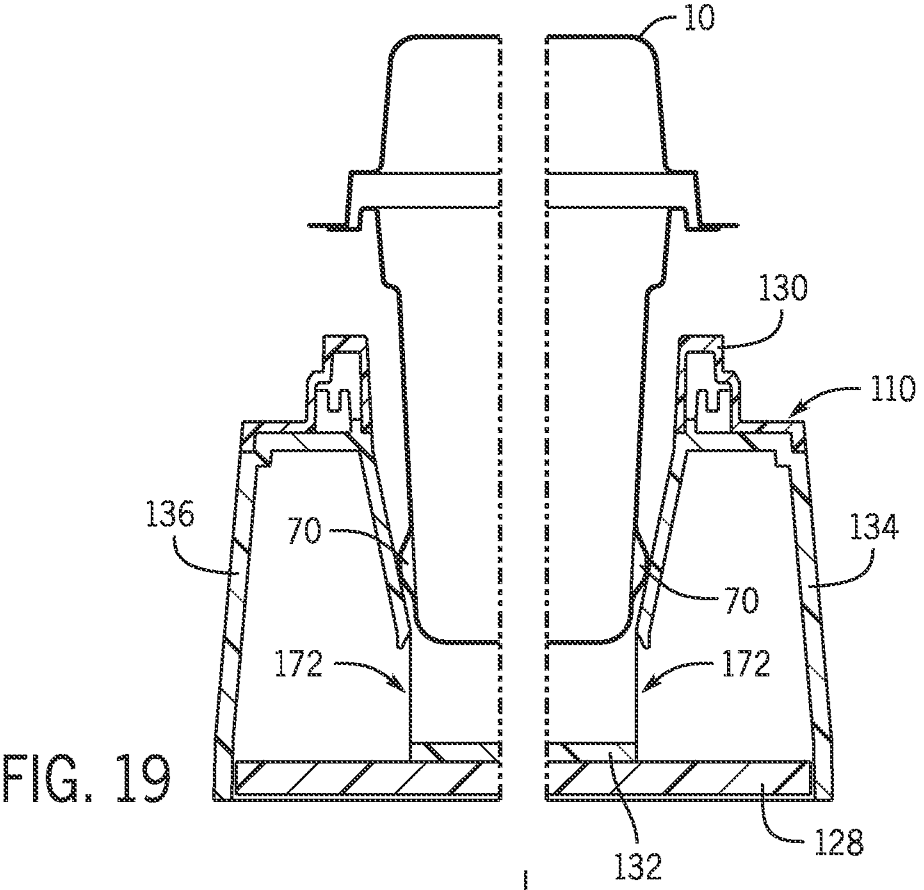
FIG. 19 is a sectional view taken along line 19-19 in FIG. 17.
Figure 20:
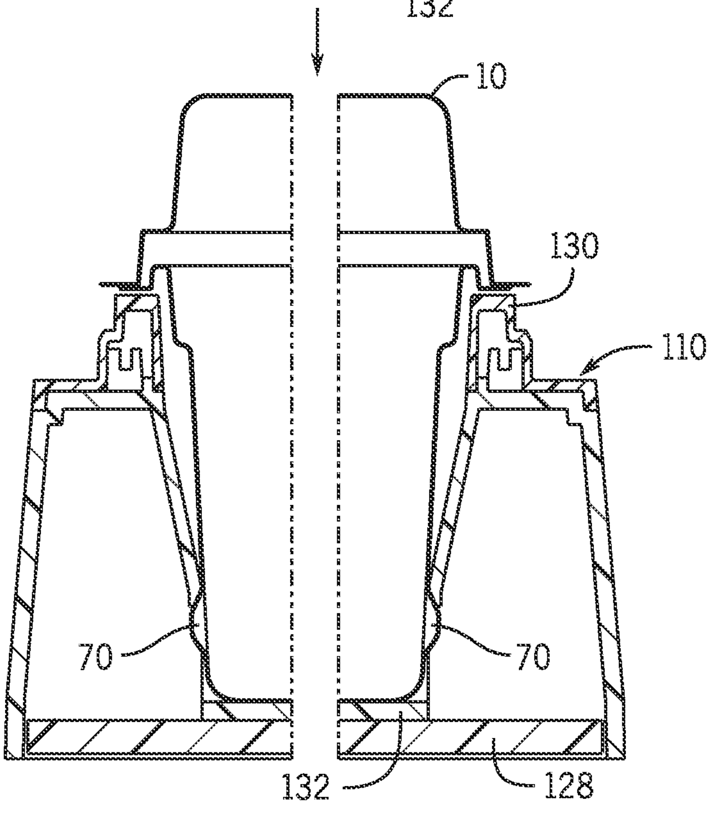
FIG. 20 is a sectional view taken along line 20-20 in FIG. 18.
Figure 23:
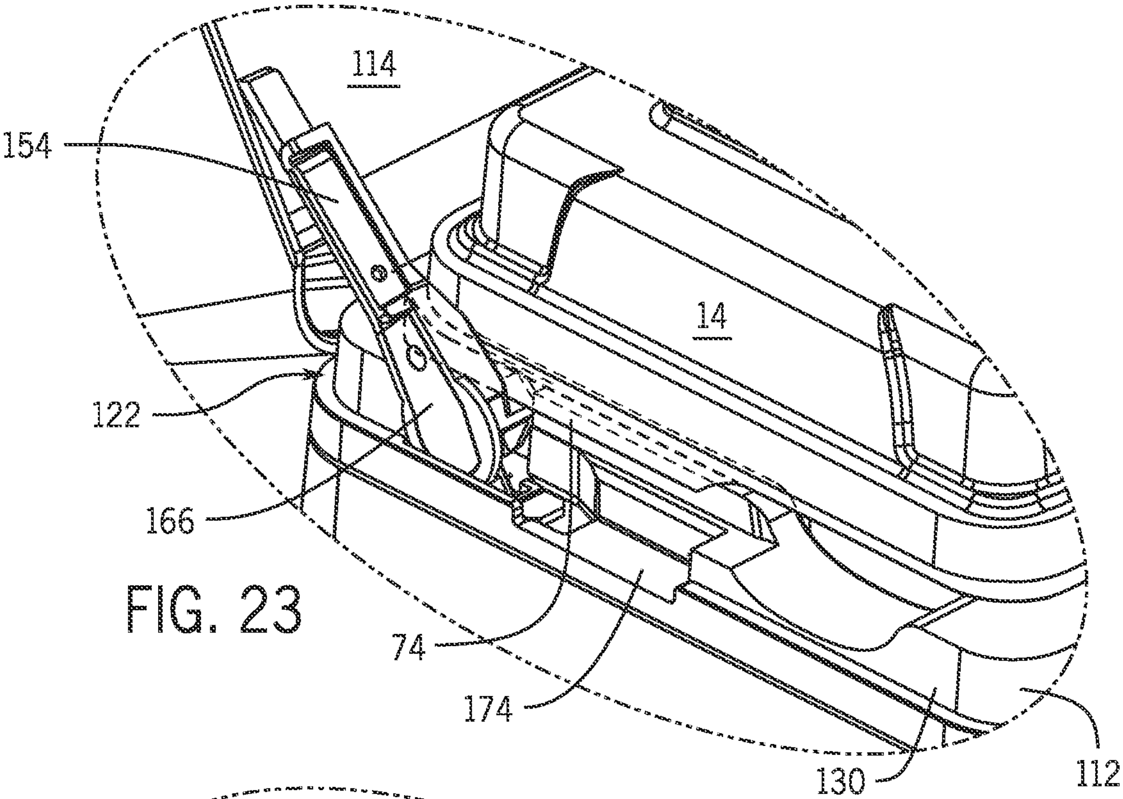
FIG. 23 is a detailed view of the region encircled in FIG. 18.

These stanchions 170 are configured to mate with corresponding locations on the ribbed walls of the lower receptacle 12, 312 of the clamshell tip container 10, 310 and provide lateral support for the receptacle of the clamshell tip container 10, 310. As previously described, the tip dispenser 110 is opened by pressing the button 120 as shown in FIG. 15. While FIG. 15 shows the button 120 being pressed by the user's finger, the button 120 can be pressed, as mentioned, using the back of hand or knuckle when the user's hands are full. With the tip dispenser 110 open as shown in FIG. 15, the clamshell tip container 10 is then placed into the dispenser 110. This is shown in FIG. 16. Referring still to FIG. 16, the lower receptacle 12 of the thermoformed clamshell container 10, 310 desirably includes a protrusion 70 on each lateral sidewall 28, 30. FIG. 16 shows the protrusion 70 on lateral sidewall 28, but lateral sidewall 30 and its protrusion cannot be seen in FIG. 16. FIG. 1 shows the inside of lateral wall 30 and part of an indentation that forms the protrusion on the lateral wall 30. In FIG. 16, the protrusion 70 is shown on lateral sidewall 28, and it should be understood that another similar protrusion is located on lateral sidewall 30 but is not shown in FIG. 16. The inner surface of the lateral side walls 134 and 136 include detents or openings 172 for receiving the protrusions 70 when the clamshell tip container 10, 310 is set fully in place the dispenser 110. Referring in particular to FIGS. 17 and 19, when the clamshell tip container 10, 310 is first set in the dispenser 110, the protrusions 70 would typically hold the container 10, 310 slightly above its full seated position. However, as shown in FIGS. 18 and 20, applying downward pressure to the container 10, 310 pushes the protrusions 70 into the openings or detents 172. This optional feature helps keep the tip container 10, 310 in the proper vertical location, for example, when the dispenser cover 114 and the container lid 14 are lifted to expose the pipette tips. The system is designed for the tip container 10, 310 to sit on the floor 132 of the dispenser base 112 as shown in FIGS. 18 and 20. FIG. 23 shows a close up view of one of the lifting mechanisms 122 holding the cover 114 of the dispenser 110 open with a tip container 10, 310 placed closed in the dispenser 110.

Figure 21:
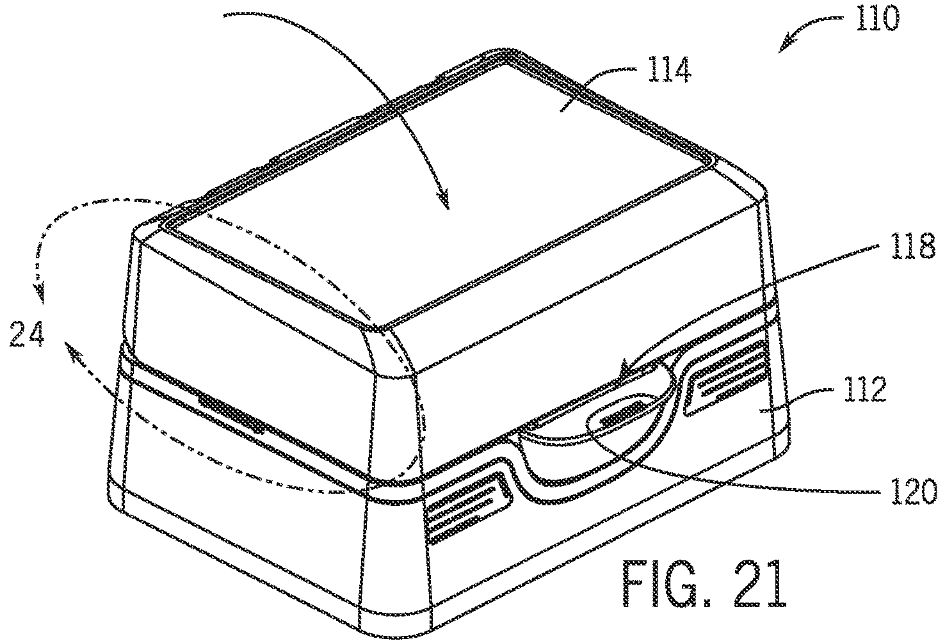
FIG. 21 shows the cover of the tip dispenser being closed with the clamshell tip container being loaded in the dispenser as shown in FIGS. 18 and 20.

FIG. 21 illustrates the next step in the progression which is closing the cover 114 of the dispenser 110. Referring for example to FIGS. 1 and 12, the lid 14, 14A of the tip container 10, 310, includes first and second overhanging wings 74, 76, 74A. These overhanging wings 74, 76, 74A extend outward from the lower rim 73 (FIG. 1) of the lid 14, 14A and are located along the lower edge of each lateral sidewall of the lid 14, 14A. The overhanging wings 74, 76, 74A are used by the lifting mechanisms 122, 124 on the tip dispenser 110 to lift the lid 14, 14A of the clamshell tip container 10, 310 at the same time that the lifting mechanisms 122, 124 are lifting the dispenser cover 114. When the clamshell tip container 10, 310 is first loaded in the dispenser 110 and the dispenser cover 114 is pushed downward into the closed position, the lifting mechanisms 122, 124 are rotated downward and guided around and beneath the overhanging wings 74, 76, 74A on the lid 14, 314 of the clamshell tip container 10, 310. This process is discussed in more detail below. In some embodiments of the invention, the lid 14, 14A is held by friction or an interference fit against the inside of the dispenser cover 114 when the cover 114 is closed, which means that the overhanging wings may not be necessary if the friction or interference fit are sufficiently robust. For example, when the locking tab 20A is folded back as shown in FIG. 12B to stow it inside the dispenser cover 114, the pressure of the locking tab 20A against the inside surface of the cover 114 is likely sufficient to hold the lid 14A of the clam shell container 310 when the dispenser cover 114 is lifted even without assistance from the overhanging wings 74A.

FIGS. 22 through 30A-D show the components and operation of lifting mechanism 122, 124. It is to be understood that lifting mechanism 124 has the same or similar components and the same similar operation as the lifting mechanism 122 shown in FIGS. 22 through 29A-D. It is to also be understood that many aspects of the invention can be accomplished using different lifting mechanisms. The disclosed embodiment uses spring-biased pivotal lifting arms, however, other types of resilient or elastomeric components can be used in place of mechanical springs. Further, weighted lever mechanisms can be used instead of the disclosed spring biased mechanism. Also, lifting pistons having various attachment points to the tip dispenser can be used in place of the pivotal lifting arms. Other kinds of mechanical lifters can also be used especially in circumstances in which the lifter is not also required to lift the clamshell container lid 14, 114.

Figure 22:
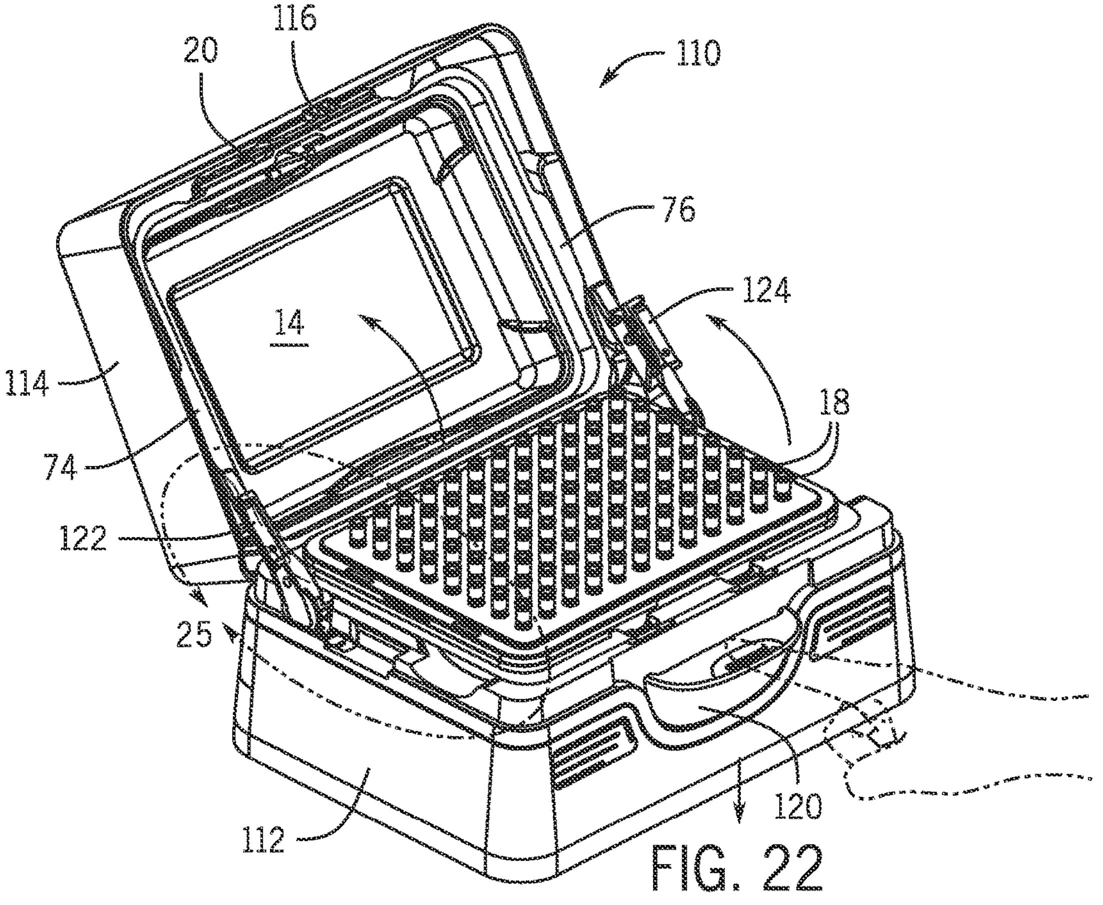
FIG. 22 shows the lifting mechanism on the dispenser lifting both the lid on the clamshell tip container and the cover on the dispenser when the front latch is released.
Figure 28:
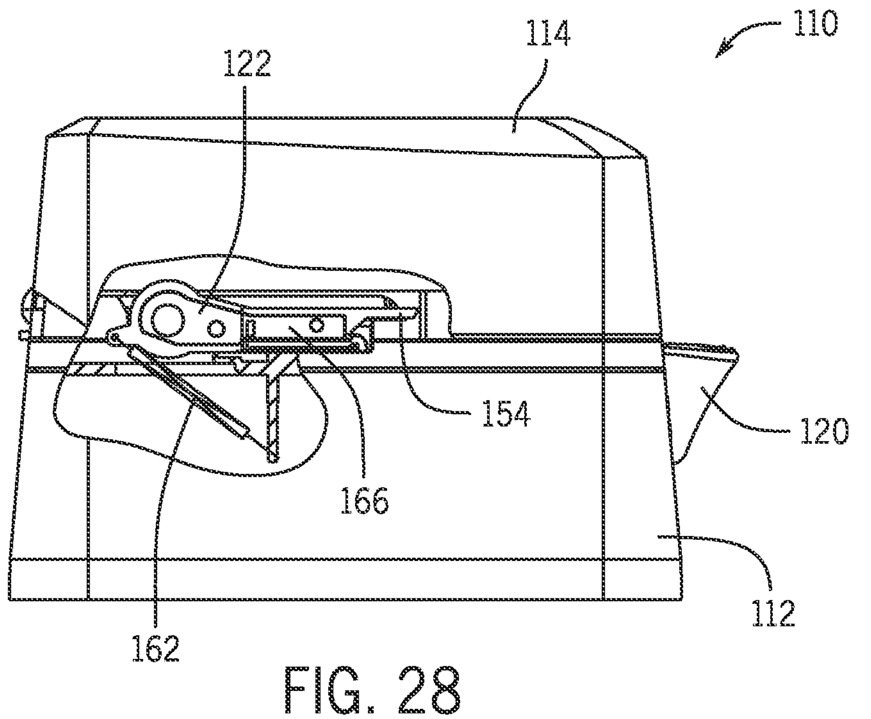
FIG. 28 is a side elevational view of the tip dispenser with parts broken away to show the lifting arm and a spring when the dispenser cover is in a closed position.

Referring briefly to FIG. 28, the lifting mechanism 122 is shown with the extension spring 162 in an extended position biased to pull the pivotal lifting arm 154 in a counterclockwise direction as shown in FIG. 22 but for the tab 116 (see FIG. 22) latching the cover 114 closed. In this closed position with the tip container 10, 310 in the dispenser 110, which is also shown in FIGS. 21 and 24, the lifting arm 154 is located underneath the respective overhanging wing 74, see FIG. 24.

Figure 25:
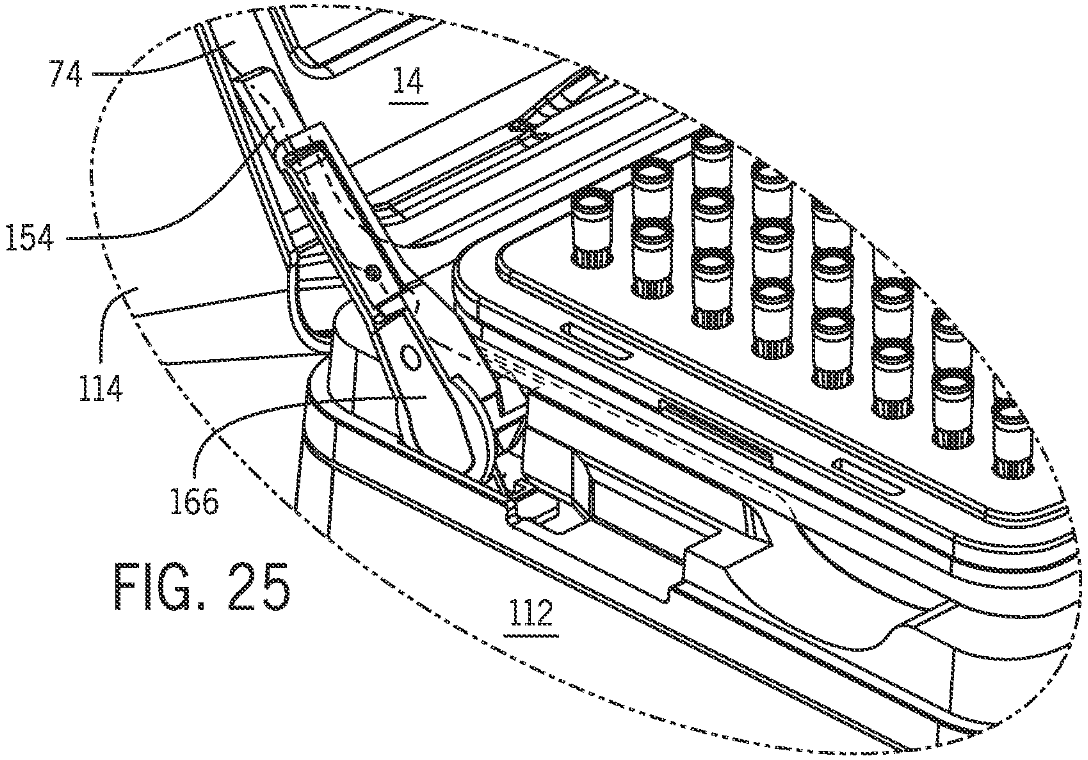
FIG. 25 is a detailed view of the encircled region in FIG. 22.
Figure 29:
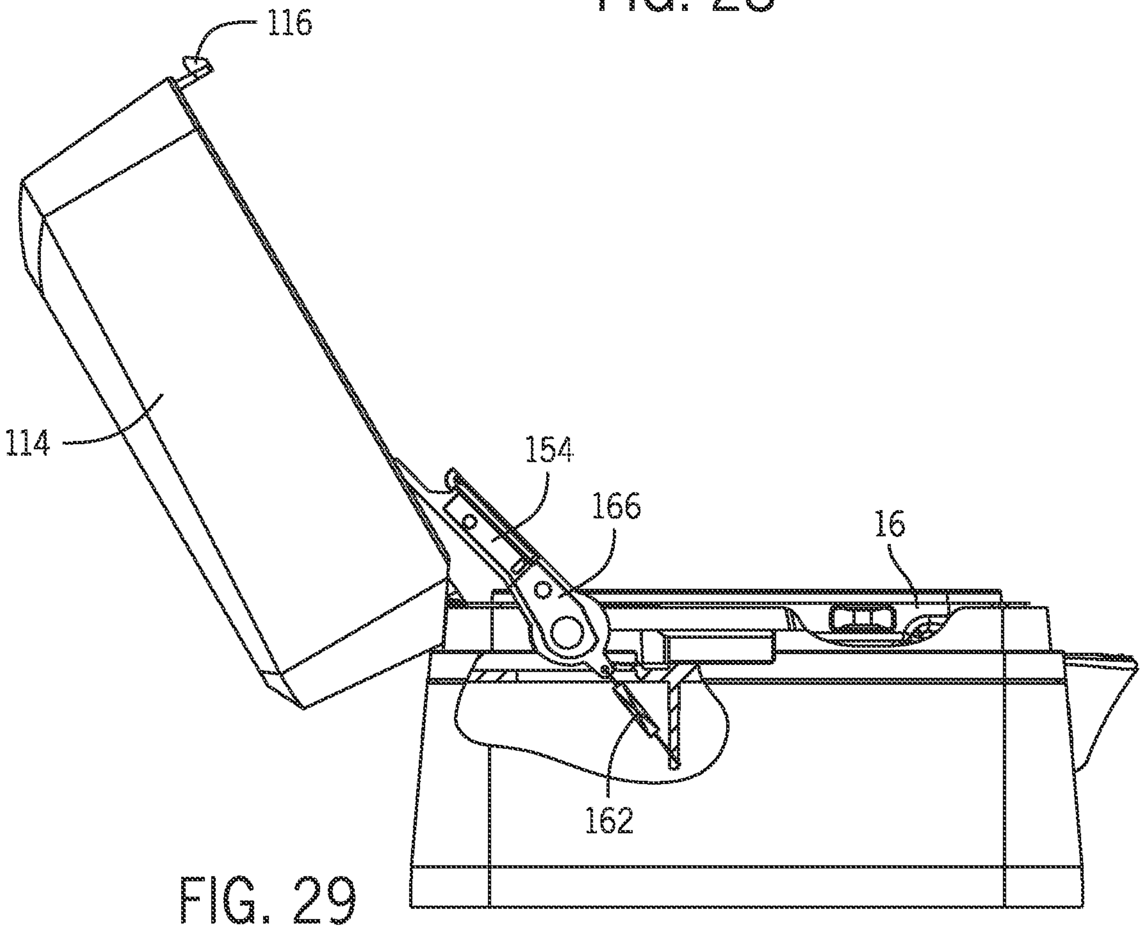
FIG. 29 is a side elevational view of the tip dispenser with parts broken away to show the lifting arm and spring when the dispenser cover is in an open position.

In FIG. 29, the lifting arm 154 is rotated to the fully open position. FIG. 29 shows extension spring 162 in a retracted position, after the latch 118 has been released to allow the dispenser cover 114 to rotate open. The fully open position with the tip container 10, 310 loaded is also shown in FIGS. 22 and 25. The lifting arm 156 and extension spring 164 on the other side of the dispenser 110 are preferably configured in the same manner. While FIGS. 28 and 29 show the use of an extension spring 162, one of ordinary skill in the art will appreciate that other types of springs, such as a torsion spring, can be used to lift each respective lifting arm 166, 168.

Comparing FIGS. 23 to 24, when a clamshell tip container 10 is first loaded into the tip dispenser 110, as previously mentioned, the lifting arm 154 must be guided around and beneath the respective overhanging wing 74, 374 when the dispenser cover 114 is closed, in order for the top surface 184 of the lifting arm 154 to be located below the overhanging wing 74. Once this is the case, then the user can depress the button 120 on the dispenser 110 to release the latch 118 and allow the springs 162 and 164 to rotate the respective lifting arms 154, 156 to lift the lid 14 of the clamshell tip container 10, 310 and the cover 114 of the dispenser 110 contemporaneously. This is shown in FIG. 22. FIG. 25 shows a detailed view of the lifting arm 154 contemporaneously lifting the overhanging wing 74 and lid 14 of the clamshell tip container 10 and the dispenser cover 114. It is also shown in FIG. 22 that the locking tab 20 on the front of the lid 14 of the clamshell tip container 10 is stowed under the cover 114 of the dispenser 110. With the pipette tips exposed as in FIG. 22, the laboratory worker can mount one or more pipette tips to the pipette. When completed mounting the tips, the user simply pushes the cover 114 downward to close the latch 118 and keep the pipette tips 18 covered until it is desirable to mount additional tips.

Figure 24:
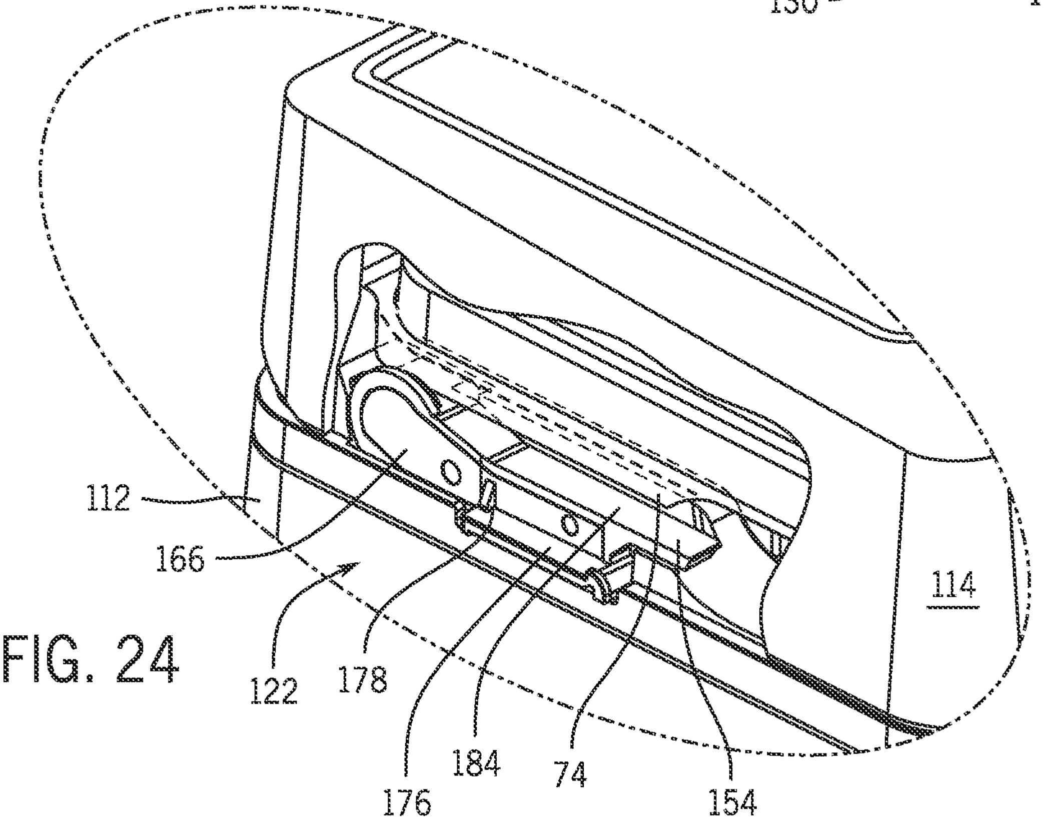
FIG. 24 is a detailed view, with parts broken away, of the encircled region in FIG. 21.

Referring to FIGS. 23 through 25, each side of the rim 130 of the dispenser base 112 includes a cutout 174. This cutout 174 provides a recess for ledge 176 that extends from the outer surface of the lifting arm 154. The other side of the dispenser base 112 includes a similar cutout as cutout 174, and the lifting arm 156 on the other side of the dispenser includes a similar ledge as ledge 176. Also shown in FIG. 24, an angled section 178 extends laterally outward from the cover 166 for the lifting arm 154 over the ledge 176. The cover 168 for lifting arm 156 on the other side of the dispenser 110 includes a similar angled section.

Figure 26:
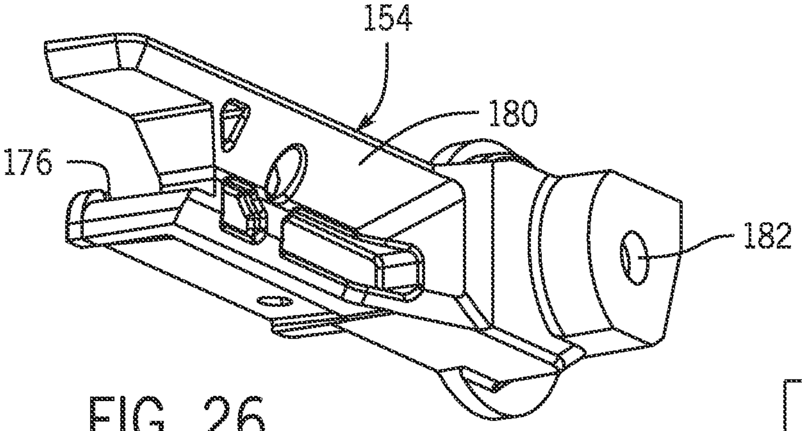
FIG. 26 is a detailed view of one of the lifting arms used in a preferred embodiment of the invention.
Figure 27:
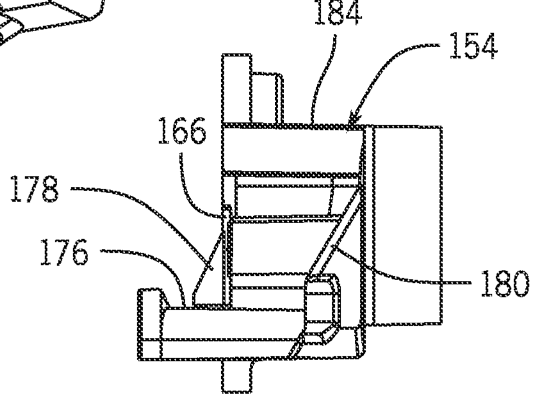
FIG. 27 is a front elevational view of the lifting arm shown in FIG. 266.

FIGS. 26 and 27 show detailed views of the lifting arm 154. The lifting arm 154 has a downward-facing angled surface 180 which is presented along the portion of the lifting arm 154 that engages the respective wing 74 on the clamshell tip container 10, 310. FIG. 26 shows a mounting hole 182 through the inside surface of the pivotal lifting arm 154. Although not shown in the figures, this hole is enlarged on the outer side of the lifting arm 154, which enables the lifting arm to be displaced laterally and/or rotationally in order to clear the respective overhanging wing 74 when the lifting arm 154 is rotated downward. When the lifting arm 154 is located underneath the overhanging wing 74 the top surface 184 of the lifting arm presses upward against the overhanging wing 74, while at the same time the outwardly extending ledge 176 on the lifting arm presses upward against the bottom edge of the sidewall of the cover 114. In this manner, the lid 14, 14A of the clamshell tip container 10, 310 is lifted at the same time as the cover 114.

As mentioned, the cover 166 for the lifting arm includes an angular section 178. This angular section 178 is used to help straighten the respective lifting arm 154 after it is rotated downward past the overhanging wing 74. This feature is optional inasmuch as the lifting arm 154 tends to naturally resume a position under the wing 74 once it has cleared the overhanging wing 74 during its downward rotation. The angled section 178 also helps to keep the lifting arm 154 aligned during the early portion of the lifting motion.

Other means for alignment can be incorporated into the upper rim 45 of the base 112, for example configuring the seating area on the rim 45 to accommodate a level position for the lifting arm 154 when it is rotated fully downward.

Figure 30D:
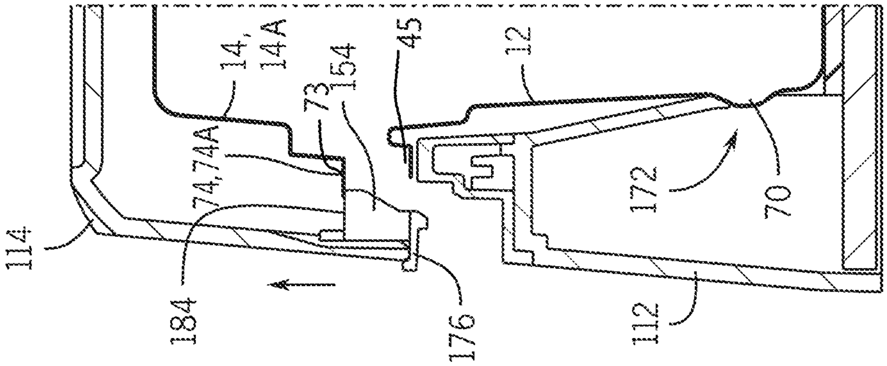
FIGS. 30A through 30D are a series of sectional views illustrating the guidance of the lifting arm on the dispenser around an overhanging wing on the clamshell tip container when the cover of the dispenser is being closed, as well as the lifting of the cover of the dispenser and the lid of the clamshell tip container when the lifting arm is being rotated into an open position.
Figure 30C:
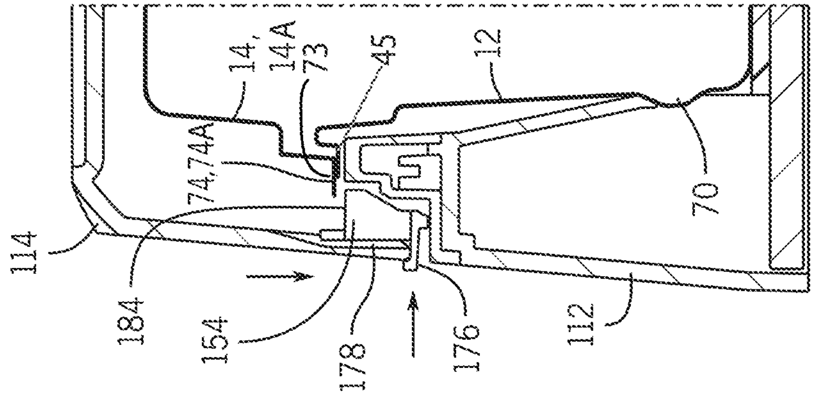
Figure 30B:
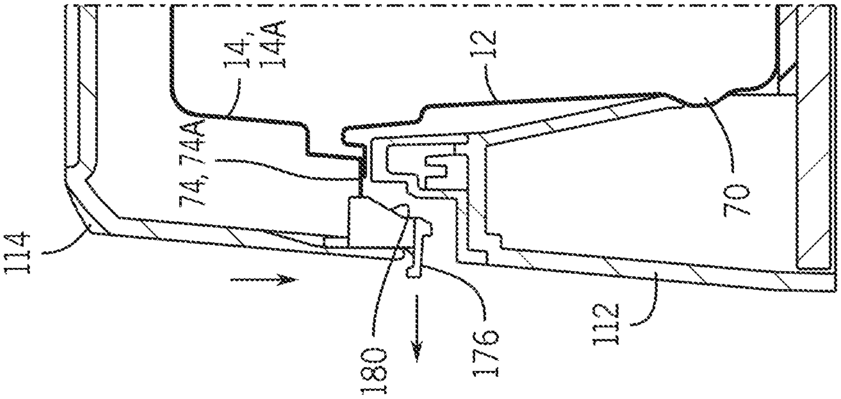
Figure 30A:
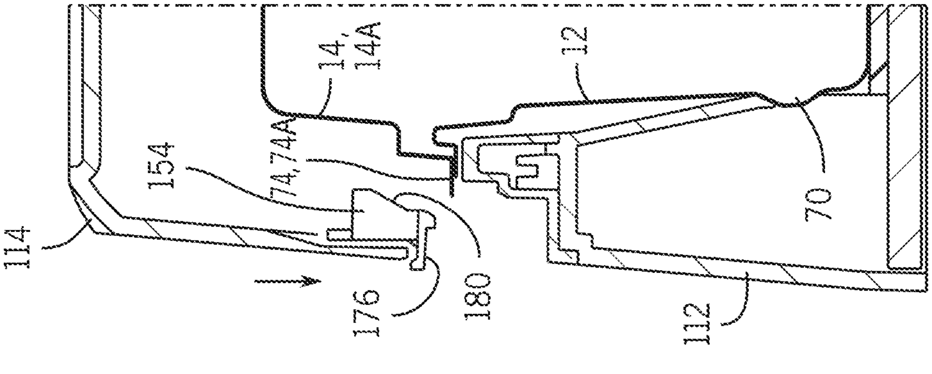
Figure 31:
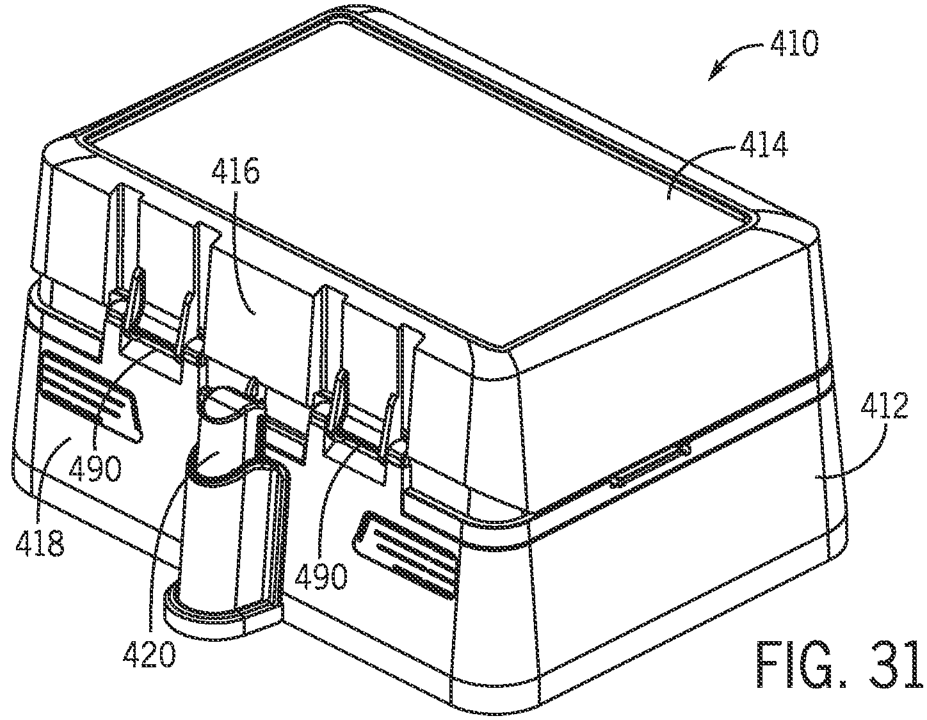
FIG. 31 is a rear perspective view of another embodiment of the tip dispenser with a dampening piston mechanism on the rear wall of the dispenser.

Referring now to FIG. 30A through 30D, a series of sectional views illustrate the interaction between the lifting arm 154 and the overhanging wing 74 of the lid 14 of the clamshell tip container 10 and the interaction with the cover 114 of the dispenser 110. Reference numbers 14A for the lid and 74A for the overhanging wing on the tip container 310 shown in FIGS. 12A and 12B as a reminder that these features and this mode of operation pertains to both disclosed tip containers 10, 310 and other similar tip containers with overhanging wings on the lid as well. FIG. 30A shows the dispenser cover 114 being pushed downward against the ledge 176 of the lifting arm 154 to rotate the lifting arm 154 downward. It is noted that the axis of rotation for the hinge for the dispenser 110 is different than the axis of rotation of the hinge for the clamshell tip container 10, 310. Also, the planes for the sectional views in FIGS. 30A through 30D are different from one another and are selected to schematically illustrate the operation of the lifting arm 154. For example, in FIG. 30A, the bottom edge of the cover 114 along this cross section is not shown to be in contact with the ledge 176 on the lifting arm 154 but the lifting arm 154 is in fact contacting the ledge 176 at a point closer to the pivot access of the lifting arm 154. In FIG. 30A, the angled downward-facing surface 180 on the lifting arm 154 has not yet contacted the overhanging wing 74, 74A on the lid 14, 14A of the clamshell tip container. FIG. 30B shows a subsequent time in the process, in which the cover 114 has been pressed or rotated further downward. The overhanging wing 74, 74A contacts the angled downward-facing surface 180 to guide the lifting arm 154 outward as shown by the arrow in 30B in order for the lifting arm 154 to clear to the side of the overhanging wing 74, 74A. FIG. 30C shows the cover 114 being pushed down to a fully closed position. In this position, the entire lifting arm 154, including its top surface 184, has cleared below the overhanging wing 74, 74A on the lid 14, 14A of the clamshell tip container. In addition, the sidewall of the cover 114 has pressed downward on the angled section 178 on the cover for the lifting arm 154 and has pushed the lifting arm 154 inward so that at least part of the top surface 184 of the lifting arm 154 resides below the overhanging wing 74, 74A. It is noted that the rim 45 of the lower receptacle 12 of the clamshell tip container 10, 310 does not extend outward far enough to be caught by a raising lifting arm 154. FIG. 30D shows the cover 114 being lifted, which occurs when the button 120 is depressed to release the latch 118 on the dispenser 110 and the respective springs rotate the respective lifting arms 154, 156 upward. As the lifting arm 154 is rotated upward, its top surface 184 pushes against the overhanging wing 74, 74A to lift the lid 14, 14A of the clamshell tip container 10, 310, while at the same time the ledge 176 on the lifting arm 154 pushes the dispenser cover 114 upward. It is noted that the protrusion 70 on the clamshell tip container is set within the detent or opening 172 on the inner sidewall of the dispenser base 112, which holds the lower receptacle 12 of the clamshell tip container 10, 310 from lifting inadvertently.

Figure 37:
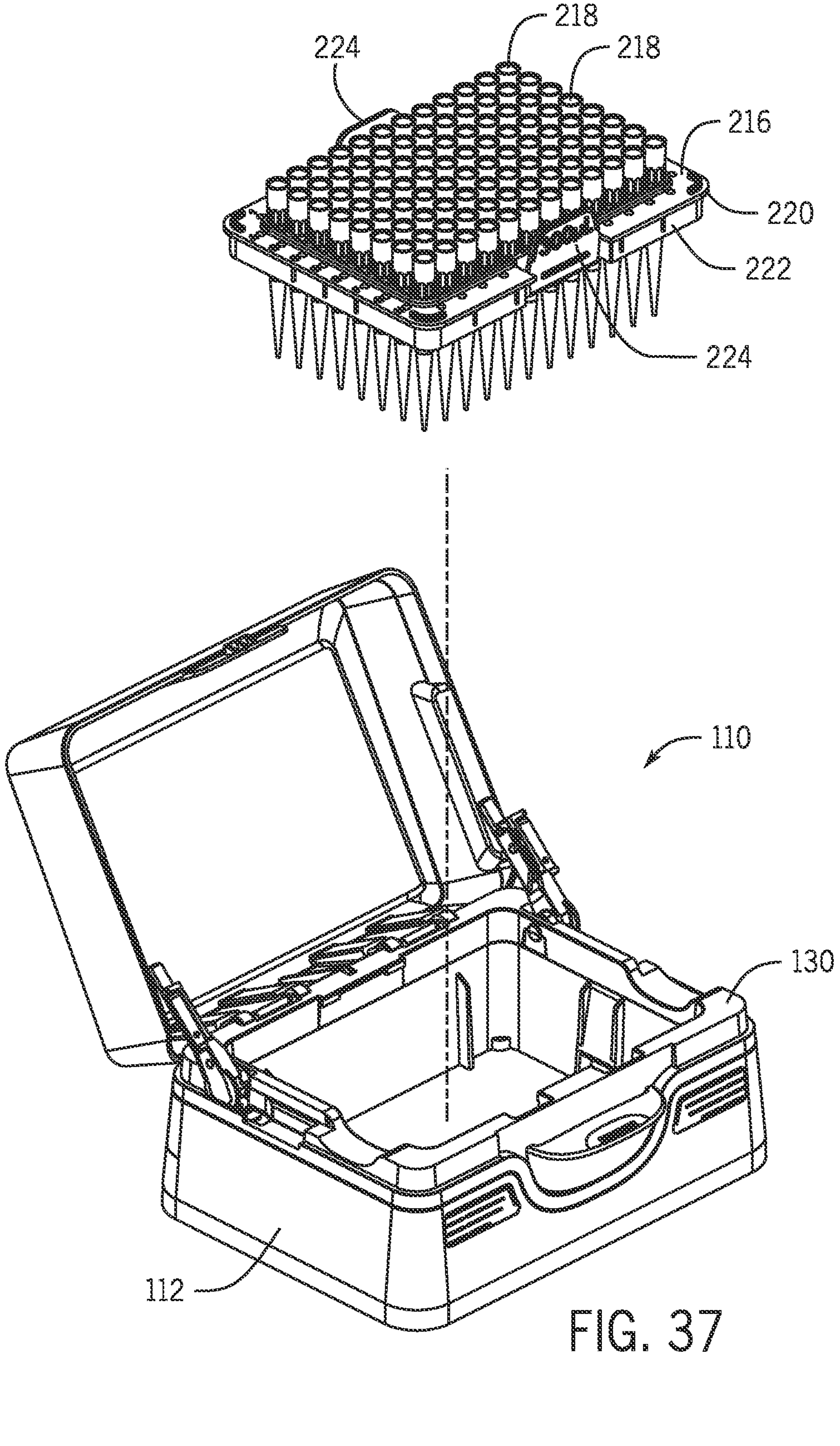
FIG. 37 shows a tip deck loaded with pipette tips ready to be loaded into the open tip dispenser, without a clamshell tip container.

FIG. 37 shows a tip deck 216 loaded with pipette tips 218 ready to be loaded into the open tip dispenser 110. The tip deck 216 shown in this embodiment has an array of 96 pipette tips 218. Around its periphery, the tip deck 216 includes a brim 220 and a skirt 222, and release tabs 224 in the front and the rear. The skirt 222 fits within the inner contour of the rim 130 of the dispenser, whereas the brim 220 is supported directly on the top surface of the rim 130. In other words, when a tip deck 216 is used without a clamshell tip container, the tip deck 216 must be supported on the rim 130 on the base 112. Once the tip deck 216 is loaded into the dispenser 110, the user can use the dispenser 110 in a similar fashion as when the tips are presented in a clamshell tip container 10, 310. The inside of the rim 130 of the base 112 also includes small indentations or protrusions to interact with the release tabs 224 on the tip deck 216.

Figure 33:
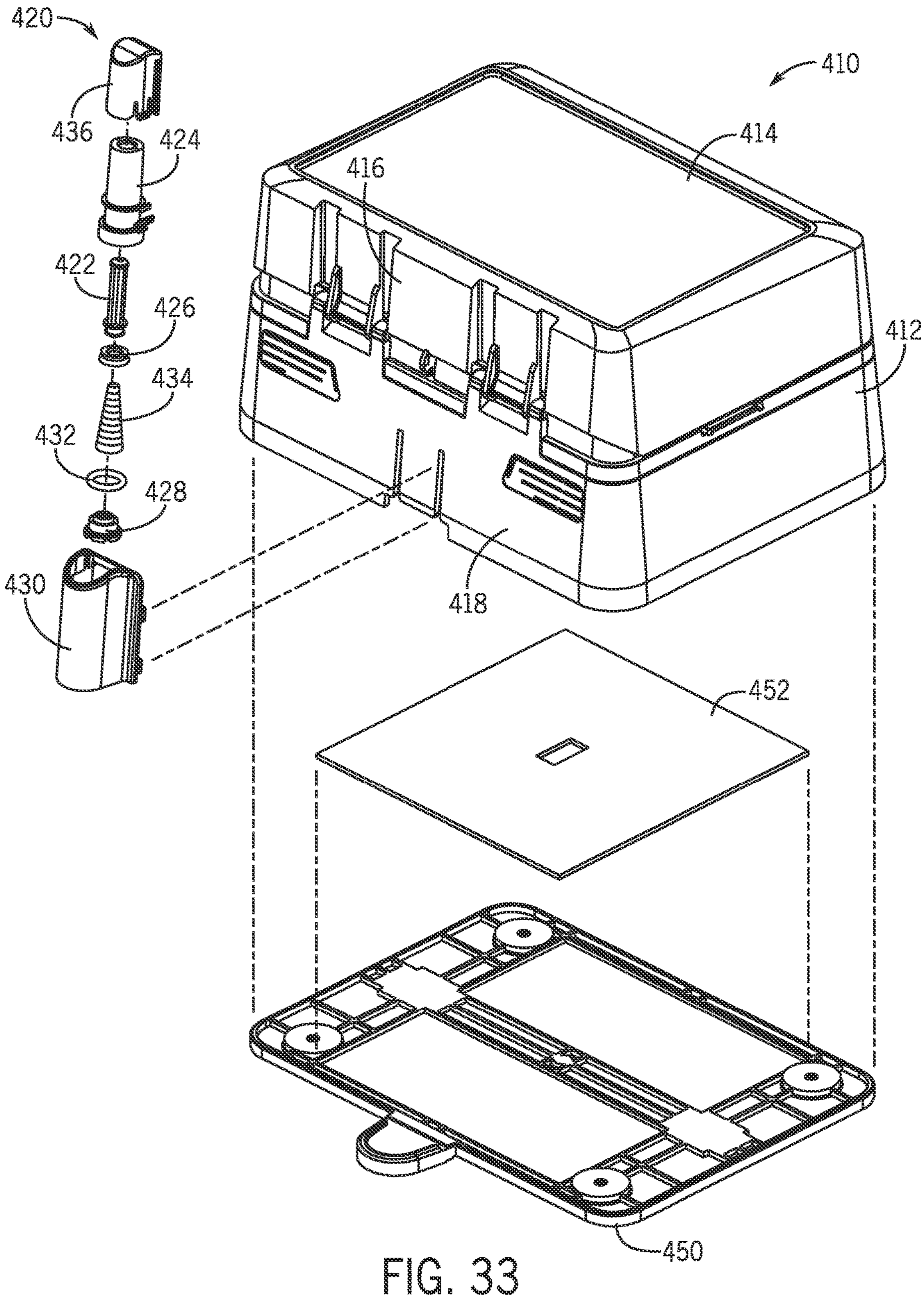
FIG. 33 is an exploded view of the tip dispenser shown in FIG. 31.

FIGS. 31 through 36 show another embodiment of the tip dispenser 410 with a dampening piston mechanism 420 on the rear wall 418 of the dispenser base 412. The dampening mechanism 420 interacts with a rear wall 416 of the lid 414 of the dispenser 410 to slow the speed that the lid 414 opens, in order to maintain the dispenser 410 comfortably stable on the benchtop. Referring to FIG. 33, the dampening mechanism 420 includes a piston 422 within a cylinder 424 located along the rear outside wall 418 of the base 412 of the dispenser 410. The cylinder 424 and piston 422 are mounted with a housing 430 that attaches to the back wall 418 of the dispenser base 412. The top of the piston 422 is connected to a button 436 that engages the back wall 416 of the lid 410 when the lid is opened to push the piston 422 downward. A seal 426 is provided on the bottom of the piston 422 to seal against the cylinder 424 when the piston 422 slides in the cylinder. A bottom cap 428 is attached to the bottom of the cylinder 424 and a seal 432 is provided for this connection as well. The bottom cap 428 for the cylinder 424 has a metering hole to allow air to escape from the cylinder 424 when the piston 422 is pushed downward into the cylinder from the rearward motion of the lid 414. A filter, tubing, perforated plate or other means can be used to adjust the air flow rate through the metering hole, if desired. A return springs 434 is provided to push the piston upward when the lid 414 is closed. FIG. 33 also shows a molded bottom plate 450 and a weighted plate 452. Multiple weighted plates can be substituted for the single weighted plate 452. Using a weighted plate 452 or plates with a plastic molded baseplate will normally be less expensive and easier to manufacture than machining a unitary metal plate to sit flatly on the benchtop.

Figure 34:
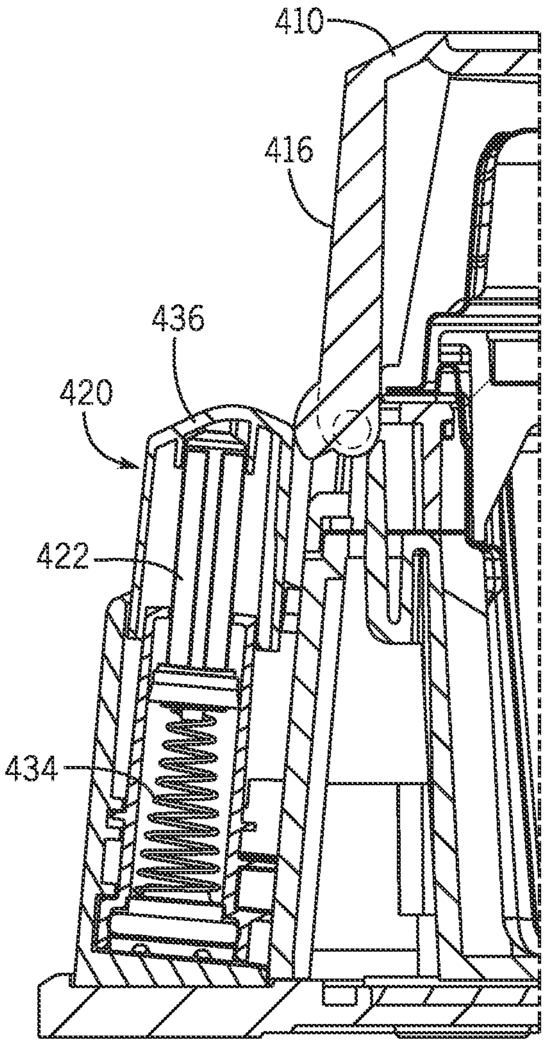
FIG. 34 is a detailed view of the section outlined by line 34-34 in FIG. 32. The cover of the tip dispenser is closed in FIG. 34.
Figure 35:
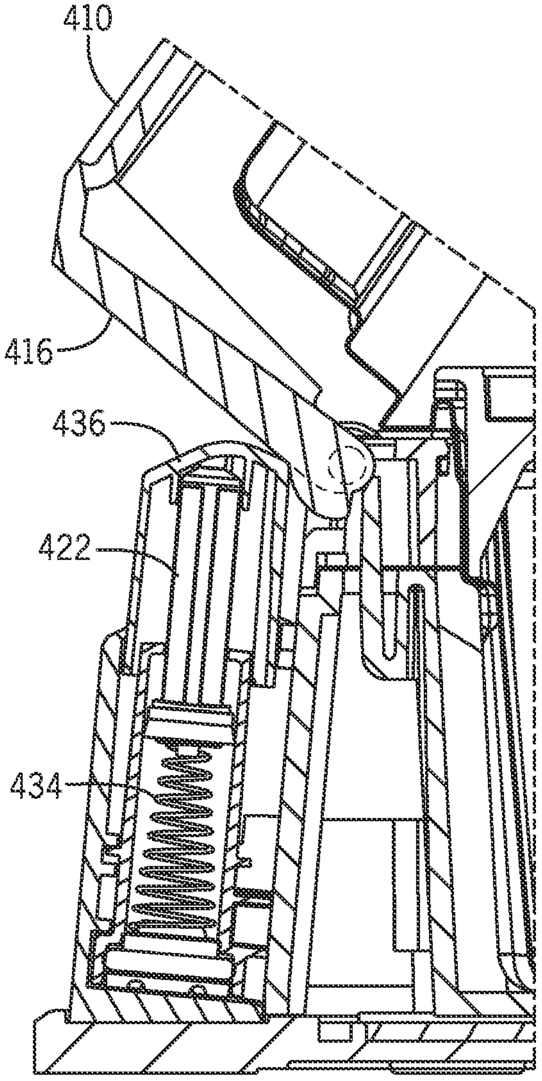
FIG. 35 is a view similar to FIG. 34, showing the cover of the tip dispenser as it is opening.
Figure 36:
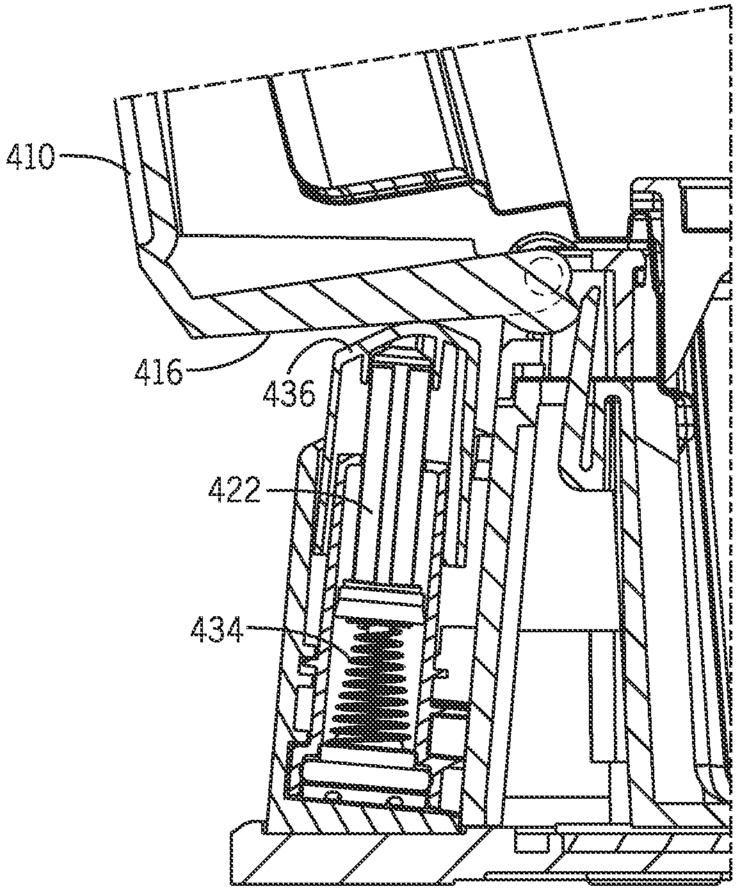
FIG. 36 is a view similar to FIGS. 34 and 35, showing the cover of the tip dispenser in a fully open position.

FIG. 34 shows the dispenser lid 410 in a closed position. In this position, the return spring 434 and the piston 422 are fully extended. FIG. 35 shows the lid 410 opening at the point that the back surface 416 of the lid 410 engages the top of the button 436 for the dampening mechanism 420. The height of the button 436 with respect to the height of the back wall 416 while the lid 410 is opening is selected to start the dampening process at a desired point in the opening process. FIG. 36 shows the lid 410 in a fully open position in which the back wall 416 of the lid 410 has pushed downward against the button 436 so that the piston 422 and the return spring 434 are in the fully retracted position. While the piston 422 pushes against the return spring 434 when it moves downward, it is preferred that the air pressure against the bottom of dampening piston 422 provides most of the resistance to the downward movement.

The present invention is not limited to the exemplary embodiments described above so long as it is covered by the subject matter of the claims that follow.

What is claimed is:

1. A clamshell tip container filled with an array of pipette tips comprising:

a tip receptacle with a bottom wall, lateral sidewalls, a front sidewall and a back sidewall, where the tip receptacle defines a well for storing the array of pipette tips;

a tip deck spanning over the well, supported by the sidewalls of the receptacle, and holding the array of pipette tips substantially vertically with collars of the respective pipette tips facing upward to facilitate mounting of the pipette tips onto pipette fittings;

a lid with a top wall, lateral sidewalls, a front sidewall and a back sidewall;

at least one hinge connecting the back sidewall of the lid to the back sidewall of the tip receptacle such that the clamshell tip container is opened by rotating the lid away from the tip receptacle along the hinge; and a first overhanging wing extending outward from at least a portion of a lower rim a of one of the lateral sidewalls of the lid, where the first overhanging wing extends outward farther than a corresponding portion of an upper rim of the lateral sidewall on the same side of the tip receptacle as the first overhanging wing;

wherein the tip receptacle, the lid and the at least one hinge are made of thermoformed plastic material.

2. The clamshell tip container filled with the array of pipette tips recited in claim 1 further comprising a second overhanging wing extending outward from at least a portion of the lower rim of the other lateral sidewall of the lid, where the second overhanging lip extends outward farther than a corresponding portion of the upper rim of the lateral sidewall on the same side of the tip receptacle as the second overhanging wing.

3. The clamshell tip container filled with the array of pipette tips recited in claim 1 wherein the clamshell tip container includes a locking tab hinge-connected along a lower edge of the front sidewall of the lid, wherein the locking tab includes one or more formed detents that engage with on one or more formed detents on the front sidewall of the tip receptacle in order to releasably close the lid on the clamshell tip container; and wherein the clamshell tip container further includes a formed detent on the front sidewall of the lid that engage with a back side of the one or more formed detents on the locking tab in order to hold the locking tab in an open position against the front sidewall of the lid.

4. The clamshell tip container filled with the array of pipette tips recited in claim 1 wherein the pipette tips held in the tip deck in the clamshell tip container are spaced apart from one another at a centerline spacing of 4.5 mm or 9 mm.

5. The clamshell tip container filled with the array of pipette tips recited in claim 4 wherein the tip deck in the clamshell tip container includes a peripheral portion surrounding the region holding the array of pipette tips, and the peripheral portion includes a brim and skirt that extends downward from the brim with brim overhanging the skirt, and the upper rim of the tip receptacle surrounds an opening configured to receive and align the skirt of the tip deck with a support ridge around the opening for supporting the brim of the tip deck, and further wherein the support ridge is at a height above any other part of the tip receptacle.

6. The clamshell tip container filled with the array of pipette tips recited in claim 1 further comprising a hinged locking tab along a lower edge of the front sidewall of the lid, wherein the locking tab includes a formed engagement protrusion that engages with the formed catch detent on a front sidewall of the lower receptacle in order to releasably close the lid on the clamshell tip container; wherein the formed engagement protrusion includes a pair of latch bosses each extending laterally from one side of the engagement protrusion such that the distance between the respective distal portions of the sidewalls of the catch detent is less than the full span between the latch bosses and the latch bosses reside between the respective proximal portions of the sidewalls of the catch detent when the locking tab is in a closed position.

* * * * *